United States Patent
Seyed Mousavi et al.

(10) Patent No.: US 11,847,311 B2
(45) Date of Patent: Dec. 19, 2023

(54) CHARACTERIZATION OF A VENTING STATE OR OTHER SYSTEM PARAMETER THAT AFFECTS THE CHARACTERIZATION OF A FORCE APPLIED TO A DEVICE

(71) Applicant: Apple Inc., Cupertino, CA (US)

(72) Inventors: Hojjat Seyed Mousavi, Santa Clara, CA (US); Yonathan Morin, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 204 days.

(21) Appl. No.: 16/847,460

(22) Filed: Apr. 13, 2020

(65) Prior Publication Data

US 2020/0371657 A1 Nov. 26, 2020

Related U.S. Application Data

(60) Provisional application No. 62/851,635, filed on May 22, 2019.

(51) Int. Cl.
*G01L 1/14* (2006.01)
*G06F 3/0488* (2022.01)
*G06F 3/044* (2006.01)

(52) U.S. Cl.
CPC .............. *G06F 3/0488* (2013.01); *G01L 1/14* (2013.01); *G06F 3/044* (2013.01); *G06F 2203/04105* (2013.01)

(58) Field of Classification Search
CPC . G06F 3/0447; G01M 3/3236; G01M 3/3254; G01M 3/3263; G01M 3/3272
See application file for complete search history.

(56) References Cited

U.S. PATENT DOCUMENTS

| | | | | | |
|---|---|---|---|---|---|
| 4,523,452 | A | * | 6/1985 | Brayman | G01M 3/3254 73/40 |
| 5,231,868 | A | * | 8/1993 | Dick | G01M 3/3236 73/49.3 |
| 5,369,983 | A | * | 12/1994 | Grenfell | G01M 3/229 73/49.3 |
| 5,459,461 | A | * | 10/1995 | Crowley | G06F 3/0221 400/491.1 |
| 5,496,174 | A | * | 3/1996 | Garner | G09B 21/003 434/114 |
| 6,279,382 | B1 | * | 8/2001 | Yatagai | G01M 3/226 73/40.7 |
| 6,356,259 | B1 | * | 3/2002 | Maeda | B32B 17/10917 156/99 |

(Continued)

*Primary Examiner* — Tran M. Tran
(74) *Attorney, Agent, or Firm* — Brownstein Hyatt Farber Schreck, LLP

(57) ABSTRACT

An electronic device includes a pressure sensor and a processor. The pressure sensor is disposed within an interior volume of the electronic device and configured to generate a time-dependent sequence of measurements related to a force applied to the electronic device. The processor is configured to characterize, using at least the time-dependent sequence of measurements, a venting state of the interior volume. In some embodiments, the electronic device may also include a capacitive force sensor disposed to detect distortion of the interior volume. A second time-dependent sequence of measurements related to the force may be generated by the capacitive force sensor, and used by the processor to characterize the venting state of the interior volume.

20 Claims, 20 Drawing Sheets

(56) References Cited

U.S. PATENT DOCUMENTS

| | | | | |
|---|---|---|---|---|
| 6,386,036 B1* | 5/2002 | Borza | | G01V 1/001 |
| | | | | 73/574 |
| 6,393,897 B1* | 5/2002 | Arnold | | G01M 3/227 |
| | | | | 73/40.7 |
| 6,522,980 B1* | 2/2003 | Arnold | | G01M 3/227 |
| | | | | 702/45 |
| 6,741,955 B2* | 5/2004 | Rutherford | | G01M 3/3254 |
| | | | | 703/2 |
| 7,073,400 B2* | 7/2006 | Benzel | | G01L 1/02 |
| | | | | 73/715 |
| 7,161,276 B2* | 1/2007 | Face | | H01H 13/7006 |
| | | | | 310/314 |
| 7,299,681 B2* | 11/2007 | Cummings | | G01M 3/229 |
| | | | | 73/40 |
| 7,784,366 B2* | 8/2010 | Daverman | | G01L 1/146 |
| | | | | 73/862.626 |
| 8,011,226 B2* | 9/2011 | Hua | | G01P 15/008 |
| | | | | 73/40 |
| 8,074,491 B2* | 12/2011 | Martino | | G01M 3/229 |
| | | | | 73/52 |
| 8,154,527 B2 | 4/2012 | Ciesla et al. | | |
| 8,306,785 B2* | 11/2012 | Foucher | | G01M 3/3236 |
| | | | | 702/188 |
| 8,928,621 B2 | 1/2015 | Ciesla et al. | | |
| 8,947,383 B2* | 2/2015 | Ciesla | | G06F 3/016 |
| | | | | 345/173 |
| 8,982,062 B2 | 3/2015 | Bos et al. | | |
| 9,128,541 B2* | 9/2015 | Fergusson | | G06F 1/1694 |
| 9,454,268 B2* | 9/2016 | Badaye | | G06F 3/0416 |
| 9,459,738 B2* | 10/2016 | Lin | | G06F 3/0418 |
| 9,488,543 B2* | 11/2016 | Willemin | | G01M 3/3272 |
| 9,542,589 B2 | 1/2017 | Thammasouk et al. | | |
| 9,552,065 B2* | 1/2017 | Yairi | | G06F 3/016 |
| 9,619,030 B2* | 4/2017 | Ciesla | | G06F 3/044 |
| 9,626,059 B2* | 4/2017 | Ciesla | | G06F 3/04895 |
| 9,719,880 B2* | 8/2017 | Konrath | | G01M 3/3236 |
| 9,720,501 B2* | 8/2017 | Ray | | G06F 3/016 |
| 9,760,172 B2* | 9/2017 | Ray | | G06F 3/041 |
| 9,772,245 B2 | 9/2017 | Besling et al. | | |
| 9,886,187 B2 | 2/2018 | Seo et al. | | |
| 10,007,343 B2* | 6/2018 | Kim | | G06F 3/041 |
| 10,031,583 B2 | 7/2018 | Levesque et al. | | |
| 10,139,975 B2 | 11/2018 | Shutzberg et al. | | |
| 10,148,857 B2* | 12/2018 | Tseng | | G06F 3/0484 |
| 10,250,289 B2 | 4/2019 | Jiang et al. | | |
| 10,367,252 B2 | 7/2019 | Ehman et al. | | |
| 10,453,766 B2 | 10/2019 | Pan et al. | | |
| 10,496,209 B2* | 12/2019 | Vummidi Murali | | G01L 25/00 |
| 10,496,211 B1 | 12/2019 | Smith | | |
| 10,508,969 B2* | 12/2019 | Cheng | | G01M 3/3281 |
| 10,585,524 B2* | 3/2020 | Keen | | H04R 1/086 |
| 11,105,703 B2* | 8/2021 | Byrne | | G01M 3/20 |
| 11,137,311 B2* | 10/2021 | Di Leo | | G01L 19/0618 |
| 11,274,985 B2* | 3/2022 | Han | | G01L 1/146 |
| 2011/0007023 A1* | 1/2011 | Abrahamsson | | G06F 3/0416 |
| | | | | 345/174 |
| 2011/0061449 A1* | 3/2011 | Yagi | | H01L 23/10 |
| | | | | 250/338.1 |
| 2011/0241442 A1* | 10/2011 | Mittleman | | H03K 17/975 |
| | | | | 29/622 |
| 2014/0069212 A1* | 3/2014 | Fishel | | G01L 1/02 |
| | | | | 73/862.581 |
| 2014/0260550 A1* | 9/2014 | Kil | | G01M 3/3272 |
| | | | | 73/40 |
| 2016/0103544 A1* | 4/2016 | Filiz | | G06F 3/0412 |
| | | | | 345/174 |
| 2017/0038880 A1 | 2/2017 | Kinzer | | |
| 2017/0269751 A1 | 9/2017 | Cho et al. | | |
| 2017/0351349 A1* | 12/2017 | Fassett | | G01L 19/14 |
| 2019/0154522 A1 | 5/2019 | Mori | | |
| 2020/0064952 A1 | 2/2020 | Gupta et al. | | |

* cited by examiner

CHARACTERIZATION OF A VENTING STATE OR OTHER SYSTEM PARAMETER THAT AFFECTS THE CHARACTERIZATION OF A FORCE APPLIED TO A DEVICE

CROSS-REFERENCE TO RELATED APPLICATION

This application is a nonprovisional of and claims the benefit under 35 U.S.C. § 119(e) of U.S. Provisional Patent Application No. 62/851,635, filed May 22, 2019, entitled "Characterization of a Venting State or Other System Parameter that Effects the Characterization of a Force Applied to a Device," the contents of which are incorporated herein by reference as if fully disclosed herein.

FIELD

The described embodiments relate generally to the characterization of a device's system parameters, and more particularly, to the characterization of system parameters that affect the characterization of a force applied to a device.

BACKGROUND

A device such as a smartphone, tablet computer, or electronic watch may include a touch sensor that indicates where a display of the device is touched, and a force sensor that indicates an amount of force applied to the display by the touch. In some cases, the force sensor may be a capacitive force sensor. A capacitive force sensor may include first and second electrodes disposed in first and second flex circuits. The flex circuits may be separated by a compressible element or gap. As the amount of force applied to the display increases, the compressible element or gap may compress, and the electrodes disposed in the flex circuits may move closer to one another, thereby decreasing the capacitance between the electrodes. The flex circuits may be coupled to circuitry (e.g., a microprocessor, an application-specific integrated circuit (ASIC), or a controller) that measures, amplifies, and digitizes the capacitance, and determines an amount of force corresponding to the capacitance. A force applied to a device may also be measured in other ways.

Various system parameters of a device may affect how a processor of the device interprets measurements obtained from its force sensor(s). In some cases incorrect assumptions about system parameters (e.g., factory settings that are no longer correct) may affect the accuracy of a processor's force characterizations (e.g., the accuracy of an amount of force determination made by the processor).

SUMMARY

Embodiments of the systems, devices, methods, and apparatus described in the present disclosure are directed to characterizing a device's system parameters, and more particularly, to characterizing system parameters that affect the characterization of a force applied to the device. Effective and appropriate characterization of system parameters may reduce the chance that an intended force input is mischaracterized or missed, and reduce the chance that noise, ambient effects, or an unintended force on the device (i.e., a false trigger) is mistakenly interpreted as a force input. In some cases, a system parameter may be characterized using a time-dependent sequence of measurements generated by a pressure sensor disposed within an interior volume of the device. System parameters may also be characterized using a time-dependent sequence of measurements generated by a capacitive force sensor disposed to detect distortion (e.g., displacement) of the interior volume.

As previously mentioned, one system parameter that a processor may use to characterize a force applied to a device is a venting state of a volume interior to the device. The venting state may indicate, for example, whether the interior volume vents freely, which may indicate that the interior volume is loosely sealed or not sealed; whether the interior volume vents slowly or not at all, which may indicate that a port connecting the interior volume to an ambient environment of the device is clogged; or whether the interior volume vents the same or differently as intended (e.g., as it was configured to vent when the device was manufactured).

In a first aspect, the present disclosure describes an electronic device including a pressure sensor and a processor. The pressure sensor may be disposed within an interior volume of the electronic device, and may be configured to generate a time-dependent sequence of measurements related to a force applied to the electronic device. The processor may be configured to characterize, using at least the time-dependent sequence of measurements, a venting state of the interior volume.

In another aspect, the present disclosure describes a method of determining an amount of force applied to an electronic device. The method may include receiving, from a pressure sensor disposed within an interior volume of the electronic device, and in response to a force applied to the electronic device, a time-dependent sequence of measurements representing a pressure change in the interior volume. The method may also include estimating, using at least the time-dependent sequence of measurements, a venting state of the interior volume, and determining an amount of force applied to the electronic device using at least the time-dependent sequence of measurements and an indicator of the characterized venting state.

In still another aspect of the disclosure, the present disclosure describes an electronic device including a first type of force sensor, a second type of force sensor, and a processor. The first type of force sensor may be configured to generate a first time-dependent sequence of measurements related to a force applied to the electronic device. The second type of force sensor may be configured to generate a second time-dependent sequence of measurements related to the force. The processor may be configured to estimate current measurements in the first time-dependent sequence of measurements using: prior measurements in the first time-dependent sequence of measurements; and measurements in the second time-dependent sequence of measurements. The processor may also be configured to quantify an error between the measurements in the first time-dependent sequence of measurements and the estimated current measurements in the first time-dependent sequence of measurements; and to estimate, using the quantified error, a parameter of the electronic device affecting at least one of the first time-dependent sequence of measurements or the second time-dependent sequence of measurements.

In addition to the aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
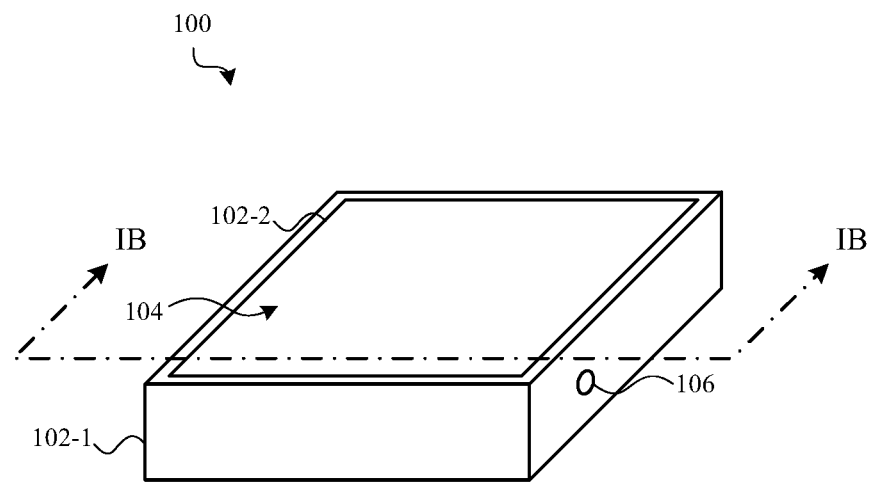
FIGS. 1A and 1B show an example of a device that includes a set of structural components defining an interior volume.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

Described herein are techniques that enable a force applied to a device to be accurately characterized. In some embodiments, the characterization of a force may include a determination of an amount of force. To facilitate an accurate determination of the amount of force, system parameters that affect the algorithm used to determine the amount of force may be characterized prior to determining the amount of force. Characterization of the system parameters can help to 1) reduce missed force inputs, 2) reduce incorrect determinations of amounts of force applied to a device, and 3) reduce the incidence of false triggers (e.g., reduce the incidence of force inputs being identified when a force input is not intended). The techniques described herein may be implemented in the field, using sensors and systems on-board a device, so that system parameters may be characterized, for example, on a periodic basis or in response to different trigger conditions (e.g., a device drop detected by an accelerometer; a change in the device's ambient pressure; a change in the device's internal pressure; a change in the device's ambient/internal pressure ratio; a change in displacement of a device cover, side, or housing component; and so on).

The described techniques employ various kinds of sensing, such as pressure sensing, capacitive force sensing, or a combination thereof. Pressure sensing may be better suited to determining an amount of force applied to a device when the device has an interior volume that is well sealed or minimally vented, or when a force is initially applied to or lifted off of the device and the pressure within the interior volume experiences a spike before exponentially decreasing in magnitude toward a steady state. Capacitive force sensing may be better suited to determining an amount of force applied to a device when the device has an interior volume that is loosely sealed or not sealed, or after the pressure within the interior volume has reached a steady state following an application of the force to the device. In some of the techniques described herein, an amount of force applied to a device may be determined using a combination of pressure sensing and capacitive force sensing, or by using pressure sensing under some conditions and capacitive force sensing under other conditions. In some cases, the type of force sensing used to determine an amount of force applied to a device may change over the lifetime of the device, as system parameters of the device drift or change, and/or in response to different conditions (e.g., environments) to which the device is exposed. In some techniques, an amount of force applied to a device may be additionally determined using one or more of barometric pressure sensing, temperature sensing, or other types of sensing.

The same pressure sensor and/or capacitive force sensor that is used to characterize a force applied to a device (e.g., determine an amount of the force) may be used to characterize system parameters that, in turn, affect the characterization of the force. Such system parameters may include, for example, a venting state of a volume interior to the device (e.g., whether air within an interior volume escapes slowly or quickly); sensor sensitivities to force (hereafter referred to sensor sensitivities; and so on.

These and other techniques are described with reference to FIGS. 1-17. However, those skilled in the art will readily appreciate that the detailed description given herein with respect to these figures is for explanatory purposes only and should not be construed as limiting.

Directional terminology, such as "top", "bottom", "upper", "lower", "front", "back", "over", "under", "left", "right", etc. is used with reference to the orientation of some of the components in some of the figures described below. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways. The use of alternative terminology, such as "or", is intended to indicate different combinations of the alternative elements. For example, A or B is intended to include, A, or B, or A and B.

Figure 1B:
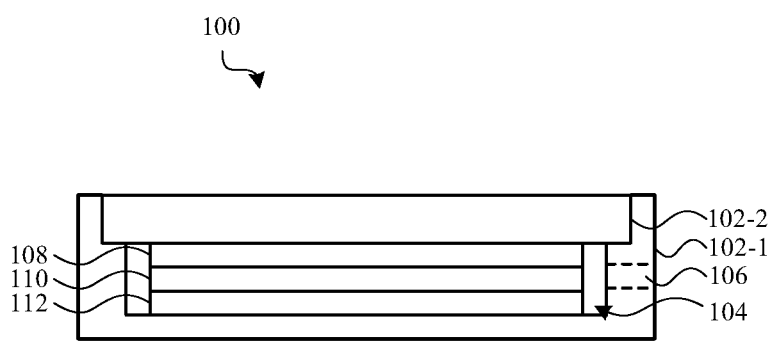

As shown in FIGS. 1A and 1B, a device 100 may include a set of structural components 102 that define an interior volume 104. FIG. 1A shows an isometric view of the device 100, and FIG. 1B shows a cross-section of the device 100.

The set of structural components 102 may include, for example, a housing 102-1 and a cover 102-2. Each structural component (e.g., each of the housing 102-1 and the cover 102-2) may define a part of the interior volume 104. The housing 102-1 may further define an opening to the interior volume 104. In some cases, the housing 102-1 may be a multi-part housing, such as a housing formed by a support plate and one or more edge members extending from the support plate to support the cover 102-2. In some cases, the cover 102-2 may be a transparent cover, such as a glass or plastic cover. The structural components may be semi-permanently or detachably joined to one another by a set of fasteners, adhesives, seals, or other components.

In some embodiments, the interior volume 104 may be sealed to prevent gases or fluids from entering or leaving the interior volume 104. In other embodiments, the interior volume 104 may not be sealed, thereby allowing gases and possibly fluids to enter or leave the interior volume 104. In some embodiments, the interior volume 104 may be vented. For example, an optional port 106 may be defined in one or more of the structural components 102, and the port may allow air (but not water) to flow between the interior volume 104 and an ambient environment of the device 100. During the lifetime of the device 100, the venting state (or sealing state) of the device 100 (e.g., sealed, not sealed, or vented) may change due to clogging of the port 106, breakage of a seal between the cover 102-2 and the housing 102-1, breakage of the cover 102-2, and so on.

As shown in FIG. 1B, a touch sensing system 108 (i.e., a system including a touch sensor), a force sensing system 110 (i.e., a system including a force sensor), a processor 112, or other components may be mounted to the set of structural components 102 and positioned partly or wholly within the interior volume 104. Some of the components (e.g., the processor 112) may alternatively be positioned entirely outside the interior volume 104, such as below a support plate or mid-plate of the housing 102-1 (not shown). The touch sensing system 108 may include, for example, a set of capacitive touch sensing elements, a set of resistive touch sensing elements, or a set of ultrasonic touch sensing elements. When a user of the device 100 touches the cover, the touch sensing system 108 (or touch sensor) may detect one or more touches on the cover 102-2 and determine locations of the touches on the cover 102-2. The touches may include, for example, touches by a user's finger or stylus.

The force sensing system 110 may include, for example, a set of capacitive force sensing elements, a set of resistive force sensing elements, or one or more pressure transducers. When a user of the device 100 presses on the cover 102-2 (i.e., applies a force to the cover 102-2), the force sensing system 110 may determine an amount of force applied to the cover 102-2 (or in some cases, the amount of force applied to a side or sides of the housing 102-1, a surface of the housing 102-1 opposite the cover 102-2, and so on). In some embodiments, the force sensing system 110 may be used alone or in combination with the touch sensing system 108 to determine a location of an applied force, or an amount of force associated with each touch in a set of multiple contemporaneous touches.

The processor 112 may be configured to operate the touch sensing system 108 or the force sensing system 110, and may be configured to receive, evaluate, propagate, or respond to signals obtained from the touch sensing system 108 or the force sensing system 110.

Figure 2A:
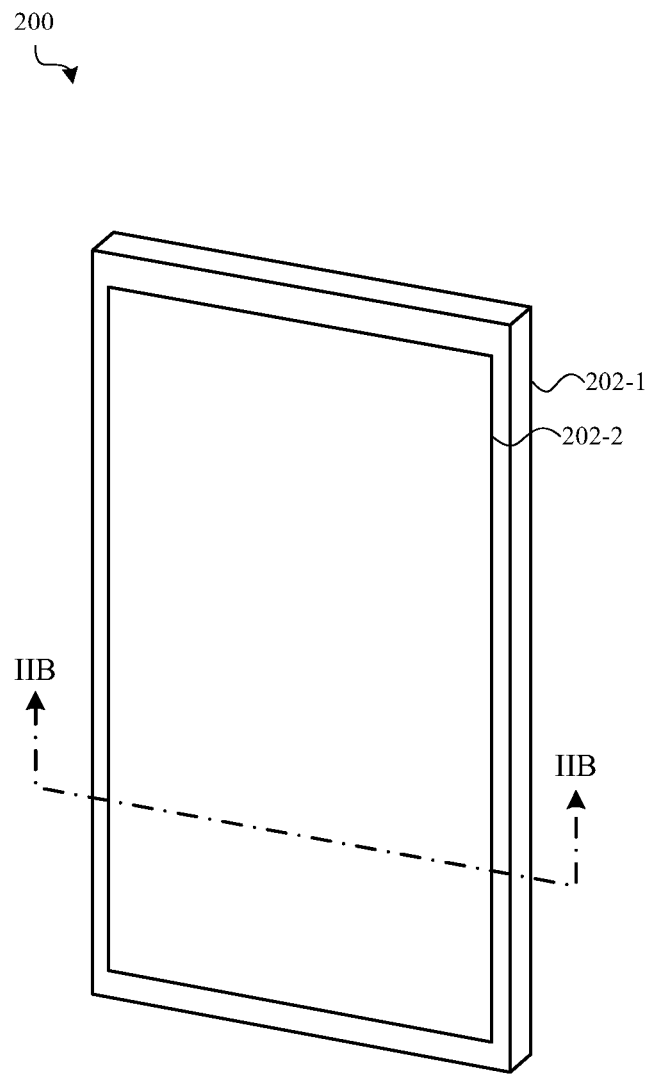
FIGS. 2A and 2B show an example device, which device may be an example of the device described with reference to FIGS. 1A & 1B.
Figure 2B:
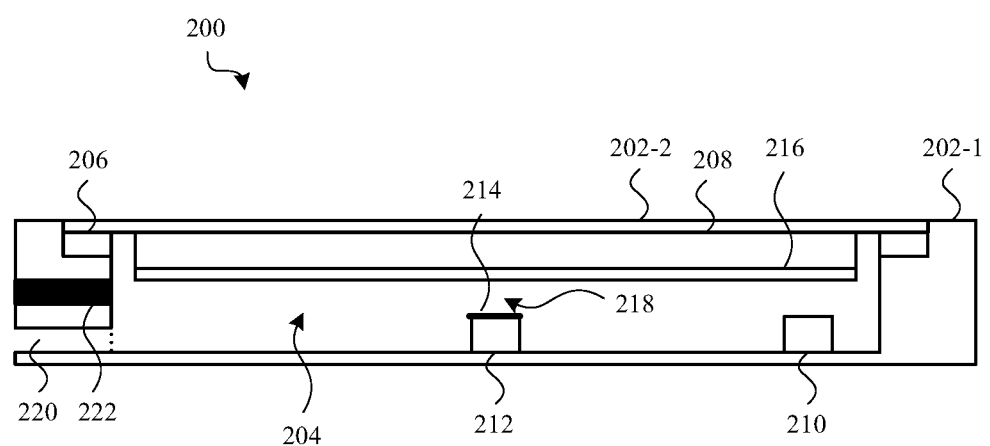

FIGS. 2A and 2B show an example device 200 (e.g., an electronic device, or smartphone), which device 200 may be an example of the device 100 described with reference to FIGS. 1A & 1B. FIG. 2A shows an isometric view of the device 200, and FIG. 2B shows a cross-section of the device 200.

The device 200 may include a set of structural components 202 that define an interior volume 204. By way of example, the set of structural components 202 may include a housing 202-1 and a cover 202-2. In some embodiments, the housing 202-1 and cover 202-2 may be configured as described with reference to FIGS. 1A & 1B. The cover 202-2 may be mounted to the housing 202-1 to cover an opening defined by the housing 202-1 (i.e., an opening into the interior volume 204). The cover 202-2 may be mounted to the housing 202-1 using fasteners, adhesives, seals, or other components. By way of example, the cover 202-2 is shown to be mounted to the housing 202-1 by a gasket 206 that separates the cover 202-2 from the housing 202-1 (see, FIG. 2B). A first adhesive may be disposed between the gasket 206 and the housing 202-1, and a second adhesive (which may have the same or different composition as the first adhesive) may be disposed between the cover 202-2 and the gasket 206.

The interior volume 204 may be sealed, not sealed, or vented, as described with reference to FIGS. 1A and 1B. In some embodiments, the interior volume 204 may be vented by means of one or more ports 220 in the housing 202-1 or elsewhere, which ports 220 may allow gas or fluid trapped within the interior volume 204 to escape, but not instantaneously. In other embodiments, the interior volume may be vented by one or more ports 220 that allow gas or fluid trapped within the interior volume 204 to escape instantaneously. In some embodiments, the port(s) 220 may allow air (but not water) to flow between the interior volume 204 and an ambient environment of the device 200.

A display 208 may be mounted within the interior volume 204. The display may be viewable through the cover 202-2. In some embodiments, a display stack or device stack (hereafter referred to as a "stack") including the display 208 may be attached to an interior surface of the cover 202-2 and extend into the interior volume 204. In some cases, the stack may include a touch sensor (e.g., a grid of capacitive touch sensing elements formed at the intersections of different electrodes in orthogonal sets of electrodes), or other layers of optical, mechanical, electrical, or other types of components.

A pressure sensor 210 may be disposed within the interior volume 204. The pressure sensor 210 may be configured to generate (and output) a first set of one or more signals, or first time-dependent sequence of measurements, related to an amount of force applied to the cover 202-2. In some cases, the first set of one or more signals may also or alternatively be related to an amount of force applied to a side or back of the device 200. In some examples, the pressure sensor 210 may be a capacitive pressure sensor or resistive (e.g., strain gauge) pressure sensor. The pressure sensor 210 may be opportunistically positioned within the interior volume 204 (e.g., the pressure sensor 210 may be positioned where space exists or where convenient). For example, the pressure sensor 210 may be attached to a logic board (e.g., a printed circuit board) mounted within the interior volume 204, or attached to an available area on a flex circuit used for force sensing or other purposes. The pressure sensor 210 need not be positioned toward a side of the device 200, but may be. In some embodiments, the pressure sensor 210 may be positioned under the center of the cover 202-2 (e.g., the positions of the sensor 212 and pressure sensor 210 may be swapped, or the sensors 212, 210 may be positioned near each other under the center of the cover 202-2).

A capacitive force sensor 212 may also be disposed within the interior volume 204, or otherwise disposed to detect distortion of the interior volume 204. The capacitive force sensor 212 may be configured to generate (and output) a second set of one or more signals, or second time-dependent sequence of measurements, related to an amount of force applied to the cover 202-2 (e.g., by a user's finger or stylus). In some embodiments, the capacitive force sensor 212 may be provided by a system in package (SiP) mounted within the interior volume 204. For example, a SiP may include a self-capacitance sense pad 214 (i.e., an electrode) adjacent (or on) a first surface of the SiP, a set of solder structures (e.g., solder balls or solder posts) attached to a second surface of the SiP (opposite the first surface), and an integrated circuit (IC) coupled to the self-capacitance sense pad 214. The IC may be configured to output, at one or more of the solder structures, an analog or digital value related to a measured capacitance of the self-capacitance sense pad 214 (i.e., the self-capacitance sense pad 214 may be configured in a self-capacitance sensing mode). The digital value may be indicative of a force or amount of force applied to the cover 202-2, or a displacement (downward movement) of the cover 202-2. The SiP may be mounted upside down with respect to the cover 202-2, such that the first surface of the SiP is positioned closer to the cover 202-2 than the second surface of the SiP. The first surface of the SiP may be oriented parallel (or substantially parallel) to the exterior surface of the cover 202-2.

The SiP may be opportunistically positioned within the interior volume 204 (e.g., the SiP may be positioned where space exists or where convenient). For example, the SiP may be attached to a logic board (e.g., a printed circuit board) mounted within the interior volume 204, or attached to an available area on a flex circuit used for force sensing or other purposes. The SiP need not be positioned under the center of the cover 202-2, but may be. The solder structures may be reflowed to electrically and mechanically attach the SiP to another structure (e.g., a logic board or flex circuit). Some solder structures of the SiP may be used to provide power, signals, or instructions to the SiP (e.g., to the IC).

In some embodiments, and as shown in FIG. 2B, a ground element 216 may be mounted within the interior volume 204, and the self-capacitance sense pad 214 may be separated from the ground element 216 by a compressible gap 218. The ground element 216 may be a layer of the stack (or may be provided within a layer of the stack), and may be positioned between the display 208 and the self-capacitance sense pad 214. Alternatively, the ground element 216 may be positioned within the display 208, or between the display 208 and the cover 202-2. By way of example, FIG. 2B shows the ground element 216 positioned between the display 208 and the self-capacitance sense pad 214. In some examples, the ground element 216 may be provided on a substrate such as a PCB (e.g., a display PCB), on a flex circuit (e.g., a display flex circuit, a touch sensor flex circuit, or a camera flex circuit), or on a surface of a substrate such as the cover 202-2. When a user applies a force to the cover 202-2, the distance (i.e., displacement) between the ground element 216 and the self-capacitance sense pad 214 may decrease, thus changing the capacitance of the self-capacitance sense pad 214 and enabling an amount of force to be detected by the IC within the SiP. Different amounts of force applied to the cover 202-2 may compress the compressible gap 218 to different extents. In alternative embodiments, the capacitive force sensor 212 may be configured in a mutual-capacitance sensing mode, and the ground element 216 may instead be a conductor through which a drive waveform is propagated.

In some alternative embodiments, the SiP may be mounted within the interior volume 204 with the first surface oriented toward an edge or the back of the device 200. With these orientations, the SiP may be used to sense a force or amount of force applied to the edge or back of the device 200 (though the SiP may also sense a force or amount of force applied to the edge or back of the device 200 when positioned as shown in FIG. 2B).

In some embodiments, one or the other of the pressure sensor 210 or capacitive force sensor 212 may not be provided. In some embodiments, the device 200 may include a plurality of pressure sensors 210 and/or a plurality of capacitive force sensors 212.

A processor within the device 200 may be configured to determine an amount of force applied to the cover 202-2 (or in some cases, an amount of force applied to an edge or back of the device 200) using the first time-dependent sequence of measurements received from the pressure sensor 210 (or from a set of multiple pressure sensors) and/or the second time-dependent sequence of measurements received from the capacitive force sensor 212 (or from a set of multiple capacitive force sensors). In some cases, the processor may determine the amount of force applied to the cover 202-2 using only the first time-dependent sequence of measurements, or a subset thereof, or only the second time-dependent sequence of measurements, or a subset thereof. The processor may be configured to use one or the other time-dependent sequences of measurements in response to evaluating a set of one or more conditions, as described, for example, with reference to FIGS. 16A-16C. In some cases, the processor may determine the amount of force applied to the cover 202-2 using both the first and second time-dependent sequences of measurements. The processor may also use a location of a touch (or locations of multiple touches, or a location of a touch centroid) to determine the amount of force applied to the cover 202-2. For example, measurements obtained from the capacitive force sensor 212 or pressure sensor 210 may be interpreted differently (e.g., associated with different amounts of force) based on where a user touches the device 200.

In some embodiments, the device 200 may include a barometric pressure sensor 222 that extends through the housing 202-1 (e.g., with a pressure sensing element of the barometric pressure sensor 222 oriented toward an environment exterior to the housing 202-1, and an electrical interface of the barometric pressure sensor 222 oriented toward the interior volume 204). The barometric pressure sensor 222 may be configured to measure the barometric pressure of an environment exterior to the device 200 (e.g., an ambient pressure of the device 200). In some cases, the barometric pressure sensor 222 may be used to measure the barometric pressure while a touch or force is being applied to the cover 202-2. In some embodiments, the barometric pressure sensor 222 may include a set of multiple pressure sensors, and measurements obtained from the multiple barometric pressure sensors may be combined (e.g., averaged) to determine the ambient pressure of the device 200.

In some cases, an air permeable but liquid water impermeable membrane may be disposed over the pressure sensing element of the barometric pressure sensor 222, to protect it from water and debris in the environment exterior to the device 200. In some embodiments, a gel or other substance may be disposed over the pressure sensing element to protect it from water and debris.

A processor within the device 200 may be configured to determine an amount of force applied to the cover 202-2 using a first set of one or more signals generated by the internal pressure sensor 210 (or by a set of multiple internal pressure sensors) and a second set of one or more signals generated by the barometric pressure sensor 222 (or by a set of multiple barometric pressure sensors).

While a pressure sensor alone may be able to detect a force, or amount of force, applied to the cover 202-2, changes in the ambient pressure of the device 200 may be affect the pressure within the interior volume 204, as a result of the port 220 connecting the interior volume 204 to the environment exterior to the device 200. Sudden changes in the ambient pressure (e.g., as may be caused by a car door slam, an open window of a moving vehicle, or a moving elevator) may be more likely to cause an abrupt change in the pressure within the interior volume 204, which pressure change may be indistinguishable from a pressure change caused by a user's intentional press on the cover 202-2. This can lead to accidental force inputs (e.g., an accidental selection of a function represented by an icon or text displayed on the device's display 208, such as the opening of an email while scrolling through a list of emails) or missed force inputs.

When the barometric pressure sensor 222 is disposed to measure the ambient pressure of the device 200, and when the pressure sensor 210 disposed within the interior volume 204 may be affected by ambient pressure changes, the ambient pressure measured by the barometric pressure sensor 222 may be used to adjust the pressure measured by the internal pressure sensor 210. For example, the ambient pressure may be subtracted from the internal pressure. The resultant pressure may provide a better indication of whether a force has been applied to the cover 202-2, as well as an amount of the applied force. In some cases, the internal pressure may only be adjusted when the ambient pressure undergoes a change, or change above a threshold, within a predetermined period of time. In some cases, the internal pressure may be adjusted for any ambient pressure change. In some embodiments, the ambient pressure may or may not be used to adjust the internal pressure, but may be used as a secondary check to determine whether a force applied to the cover 202-2 is likely a user-applied force. For example, upon detecting a force using a pressure measurement obtained from the internal pressure sensor 210, an ambient pressure measurement obtained from the barometric pressure sensor 222 may be used to determine whether a same or similar pressure change occurred external to the device 200. If so, the pressure change detected by the internal pressure sensor 210 may be ignored as not being associated with a user-applied force to the cover 202-2. Still further, a sudden change in ambient pressure may be used to temporarily disable force sensing functionality of the device 200 or adjust a force sensing threshold.

Although FIGS. 2A and 2B show a particular form-factor for device 200, the structures and techniques described with reference to FIGS. 2A and 2B may be used to deploy pressure-based force sensing alone, capacitive (or displacement-based) force sensing alone, a combination of pressure-based and capacitive force sensing, or combinations of other types of force sensing. A single force sensing type, or combination of force sensing types, may be deployed in almost any kind of device having an interior volume 204 that is capable of compressing or otherwise changing shape, including, for example, a tablet computer or electronic watch. In some embodiments, capacitive force sensing may be deployed in a form factor other than in a SiP. For example, a capacitance sense pad may be disposed on a printed circuit board (PCB) or other substrate, adjacent an ASIC or other controller that senses a capacitance of the capacitance sense pad. As another example, a capacitance sense pad may be disposed on a semiconductor wafer (i.e., a semiconductor "chip"), and a circuit for sensing the capacitance of the capacitance sense pad may be formed on the wafer. PCBs or wafers may occupy less z space than a SiP, but may increase the size of the gap 218. In some embodiments, a PCB or wafer may be elevated using a standoff, or disposed on top of another component that positions it closer to the ground element 216 or cover 202-2. A wafer may provide the smallest form factor for a capacitance sense pad and related circuitry, but at a higher cost than a PCB or SiP implementation.

Figure 3A:
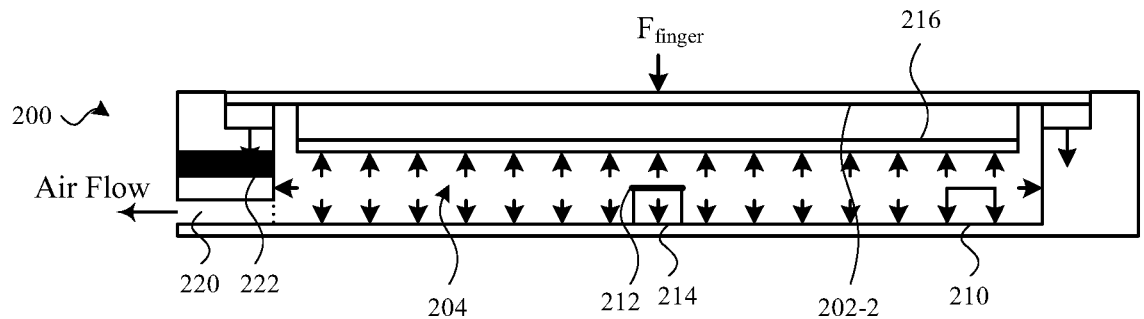
FIGS. 3A-3E show the device cross-section of FIG. 2B when, and after, a force is applied to a cover of the device.

FIGS. 3A-3E show the device cross-section of FIG. 2B when, and after, a force is applied to the cover 202-2. In particular, FIG. 3A shows an initial application of force (e.g., $F_{finger}$) to the cover 202-2. When the port 220 is small in size compared to the interior volume 204, and a gas or fluid (e.g., air) contained within the interior volume 204 is unable to escape the interior volume 204 freely, the gas or fluid contained within the interior volume 204 may operate as a spring on the cover 202-2 (e.g., an air spring). The spring effect (e.g., air spring effect) may provide a pressure or resistance that opposes the force (e.g., $F_{finger}$) applied to the cover 202-2. For example, and referring to FIG. 3A, a force applied to the center of the cover 202-2 may be opposed by the forces represented by the small arrows within the interior volume 204.

Figure 3B:
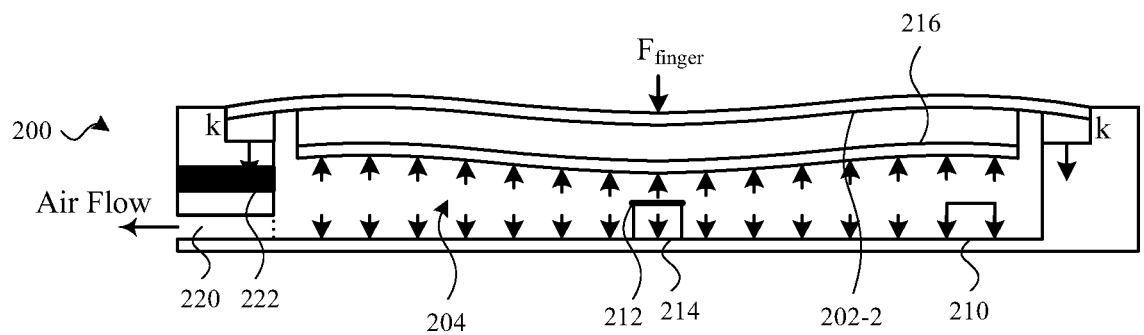

As the force continues to be applied to the cover 202-2, and as shown in FIG. 3B, the air spring effect may cause portions of the cover 202-2 to bow outward upon continued application of the force $F_{finger}$. The portions of the cover 202-2 may bow outward as a result of the pressure within the interior volume 204 increasing, and as a result of gases or fluid within the interior volume 204 being compressed. Also upon application of the force $F_{finger}$, the gasket 206 that bonds the cover 202-2 to the housing 202-1 (with spring constant k) may apply an inward force to the edges of the cover 202-2. In other cases (not illustrated in FIG. 3B), the force distribution inside the interior volume 204 as a result of the air spring effect may differ. For example, the gasket 206 may apply an outward force to the edges of the cover 202-2. More generally, whether or not a gasket such as the gasket 206 applies an inward force, outward force, or any force to the edges of the cover 202-2 may be a function of the interior volume 204, the aspect ratio (e.g., length, width, and thickness) of the cover 202-2, and other factors. The forces (if any) applied to the edges of the cover 202-2 by the gasket 206 are the result of a force balancing problem involving the force $F_{finger}$ applied to the cover 202-2, the pressure within the interior volume 204 when the force $F_{finger}$ is applied (e.g., a back pressure force), and the gasket force. The force balancing problem may be modeled for a particular device using finite element analysis (FEA). In general, a gasket may be expected to apply an inward force to the edges of a cover when a device has a long, thin, glass cover, as may be the case in the device 200; and a gasket may be expected to apply an outward force to the edges of a cover when a device has a short, thick, glass cover, as may be the case in an electronic watch.

Figure 3C:
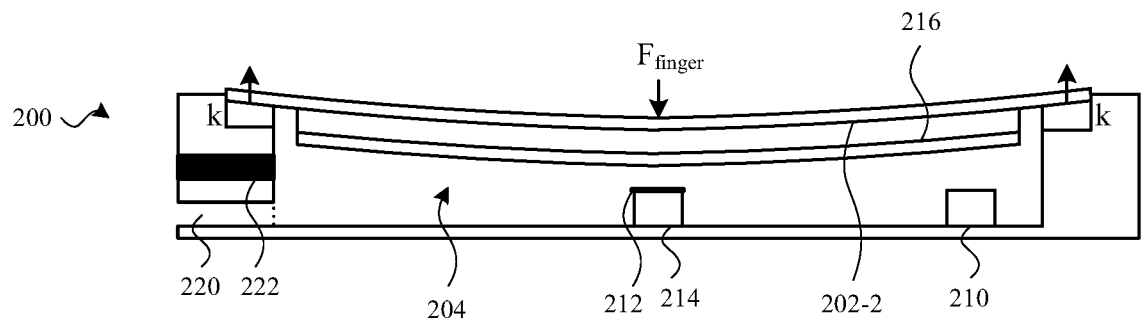

When the interior volume 204 is vented, thereby enabling a gas or fluid contained within the volume 204 to escape after application of the force $F_{finger}$ (but not escape immediately upon application of the force $F_{finger}$), the air spring effect illustrated with reference to FIG. 3B may decrease over time. Air flow out of the interior volume 204 is indicated by the arrow directed away from the port 220 in FIG. 3B. As air escapes the interior volume 204, the pressure within the interior volume 204 may exponentially decrease until the steady state shown in FIG. 3C is reached. In the steady state, the force $F_{finger}$ may not be opposed by the pressure or distribution of gases or fluids within the interior volume 204, and the edges of the cover 202-2 may apply an outward force (or alternatively, an inward force) to the gasket 206.

When the interior volume 204 is not sealed, or when a gas or fluid (e.g., air) contained within the interior volume 204 is able to escape the interior volume 204 freely, the gas or fluid contained within the interior volume 204 may readily escape when the force $F_{finger}$ is applied to the cover 202-2, and the steady state shown in FIG. 3C may be reached very soon (or immediately) after application of the force $F_{finger}$ (e.g., without passing through the stage shown in FIG. 3B).

Figure 3D:
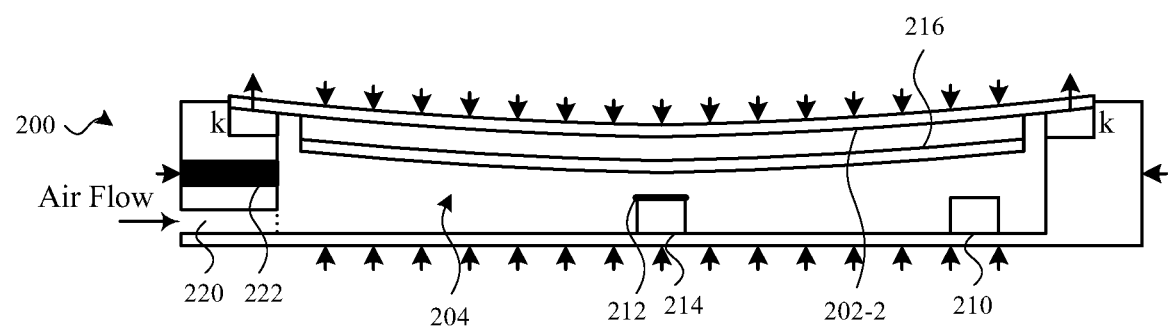
Figure 3E:
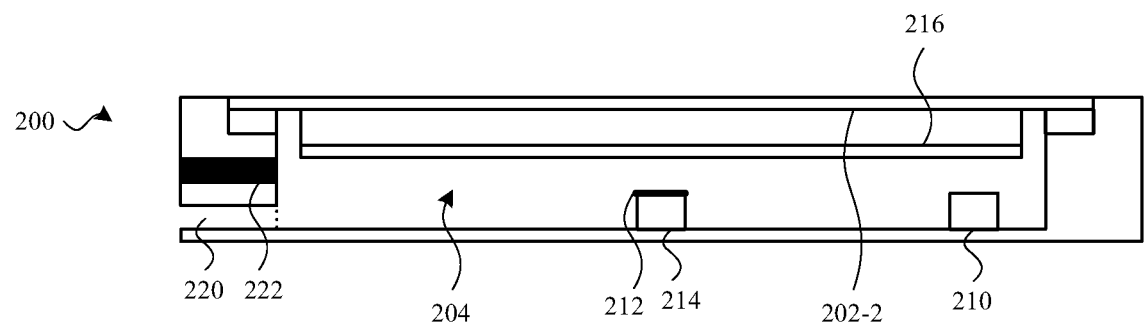

FIG. 3D shows the device 200 immediately after removal (liftoff) of the force $F_{finger}$. As shown, the ambient environment of the device 200 may initially oppose return of the cover 202-2 to a steady state position. As air flows back into the interior volume 204, the device 200 returns to a steady state, as shown in FIG. 3E.

Between the time that the force $F_{finger}$ is initially applied to the cover 202-2 (as shown in FIG. 3A) and the time the pressure within the interior volume 204 reaches a steady state following application of the force $F_{finger}$ (as shown in FIG. 3C), the capacitance measurements generated by the capacitive force sensor 212 may change. The change in the capacitance measurements may be caused by a change in the distance between the ground element 216 attached to the cover 202-2 and the self-capacitance sense pad of the capacitive force sensor 212. Also between the time the force $F_{finger}$ is initially applied to the cover 202-2 and the time the pressure within the interior volume 204 reaches a steady state following application of the force $F_{finger}$, and assuming a well-sealed or slowly vented interior volume 204, the pressure measurements generated by the pressure sensor 210 may change.

Figure 4A:
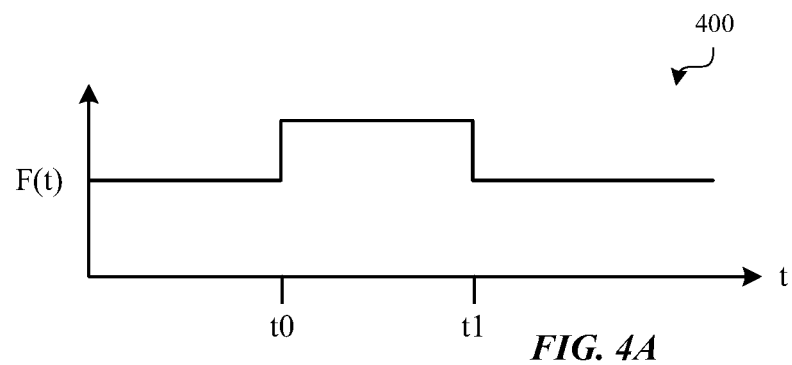
FIG. 4A-4C are graphs of example outputs of the pressure sensor and capacitive force sensor described with reference to FIGS. 2B and 3A-3E, in response to the application and removal (liftoff) of a force on a device.
Figure 4B:
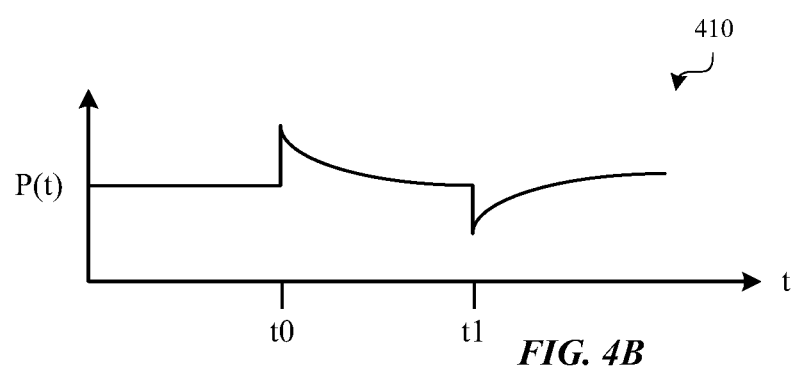
Figure 4C:
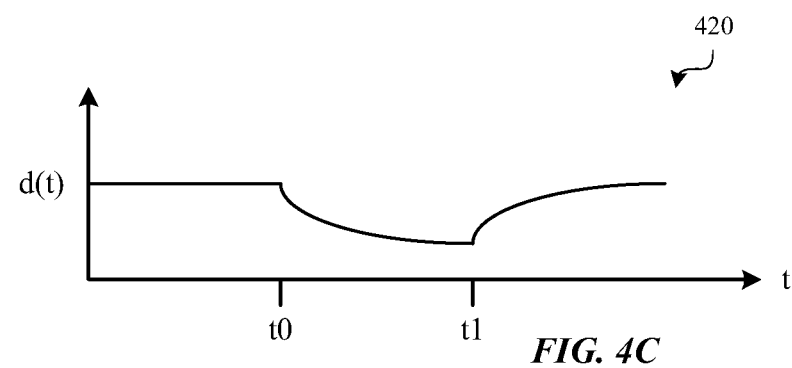

FIGS. 4A-4C are graphs of example outputs of the pressure sensor 210 and capacitive force sensor 212 described with reference to FIGS. 2B and 3A-3E, in response to application and removal (liftoff) of a force on the cover 202-2. FIG. 4A shows a graph 400 of the force over time, F(t). FIG. 4B shows a graph 410 of the pressure sensor's response to the force, P(t). 4C shows a graph 420 of the capacitive force sensor's response to the force, in terms of displacement, d(t), of a ground element (e.g., the ground element 216 described with reference to FIGS. 2B and 3A-3E.

As shown in FIG. 4A, a steady state force may be applied to the cover 202-2 at a time t0, and lifted off at a time t1. As shown in FIG. 4B, the pressure measured by the pressure sensor 210 may spike upward when the force is initially applied to the cover 202-2 at time t0, as a result of an air spring effect, and then exponentially decay as air (or another gas, or a liquid) flows out of the interior volume 204. Similarly, the pressure measured by the pressure sensor 210 may spike downward when the force is initially lifted off at time t1, and exponentially increase after liftoff.

As shown in FIG. 4C, the amount of displacement of the cover 202-2 increases exponentially, but in a negative direction, beginning when the force is applied to the cover 202-2 at time t0. As the displacement of the cover 202-2 increases exponentially, the distance between the ground element 216 and self-capacitance sense pad 214 described with reference to FIGS. 2B and 3A-3E exponentially decreases, and the capacitance sensed by the capacitive force sensor 212 exponentially increases. Similarly, the amount of displacement of the cover 202-2 decreases exponentially, but in a positive direction, after liftoff of the force, beginning at time t1. As the displacement of the cover 202-2 decreases exponentially, the distance between the ground element 216 and self-capacitance sense pad 214 exponentially increases, and the capacitance sensed by the capacitive force sensor 212 exponentially decreases.

The pressures and displacements shown in FIGS. 4A-4C have various characteristics, such as peak positive and negative pressures at times t0 and t1, pressure decrease and increase rates after times t0 and t1, and displacement increase and decrease rates after times t0 and t1. Each of the pressure decrease and increase, and displacement increase and decrease, are also associated with a measurable time period in which the pressure sensor 210 or capacitive force sensor 212 generates useful measurements. For example, as the pressure exponentially decreases between times t0 and t1, the pressure may reach a value where further changes in the pressure are too small to be measured by the pressure sensor 210 (e.g., a further change in pressure may be beyond the sensitivity of the pressure sensor 210). A measurable time period during application of a force may span the entire time period between t0 and t1, or only part of the time period between t0 to t1.

The pressures and displacements shown in FIGS. 4B and 4C may be affected by various system parameters, some of which may change as a device is used in the field, used over time, or subjected to various events (e.g., a drop, use in a car with the windows down, use on a high-speed train, use in an elevator, and so on). One of these system parameters is a sealing/venting characteristic of the interior volume 204. The sealing/venting characteristic of the interior volume 204 (sometimes referred to herein as a sealing state or a venting state) may be defined by a value of Tau ($\tau$), which indicates the time it takes the interior volume 204 to reach a steady state pressure following application or liftoff of a steady state force (e.g., F(t) in FIG. 4A) to the cover 202-2. The interior volume 204 may be designed to have a particular value of $\tau$, but through breakage of the gasket 206 or cover 202-2, blockage of the port 220, and other factors, the value of $\tau$ may change over time.

At small values of $\tau$, indicative of a more loosely sealed or well-vented interior volume 204, the pressure spike at t0 or t1 in FIG. 4B may be relatively small, and the pressure within the interior volume 204 may reach a steady state relatively quickly. Also, the cover 202-2 may reach its maximum displacement in response to a steady state force relatively quickly. At moderate values of $\tau$, indicative of a better-sealed and moderately-vented interior volume 204, the pressure spike at t0 or t1 in FIG. 4B may be larger, and the pressure within the interior volume 204 may reach a steady state at a moderate rate. At high values of $\tau$, indicative of a well-sealed and slowly-vented or non-vented interior volume 204, the pressure spike at t0 or t1 in FIG. 4B may again be relatively small (e.g., because the cover 202-2 may not deflect or deflect very little), and the pressure within the interior volume 204 may change very little when a steady state force is applied to the cover 202-2.

Figure 5:
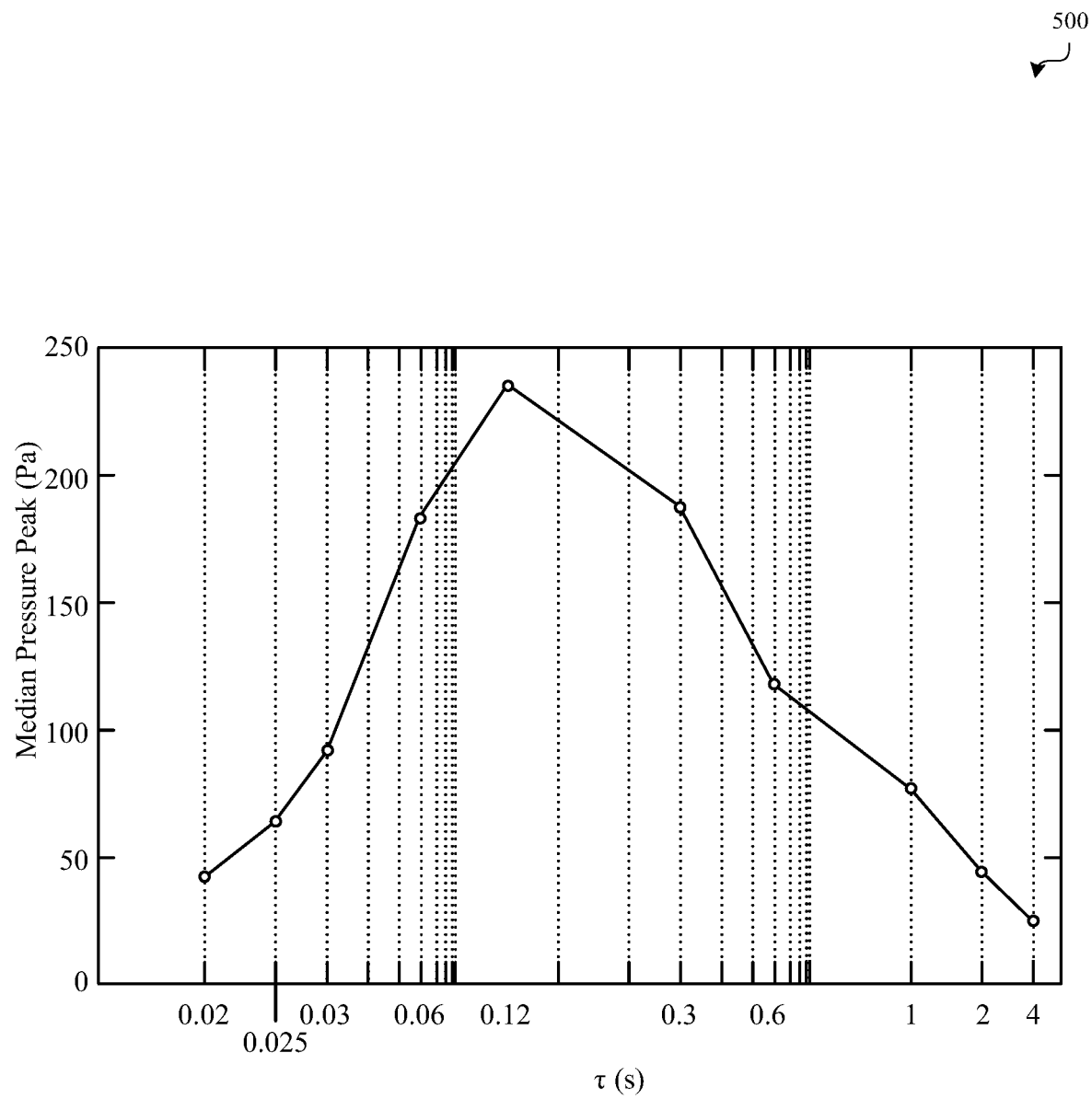
FIG. 5 shows an example graph of values of a venting state (t) versus the absolute value of median pressure peaks (e.g., negative pressure peaks) of a force applied to a device.

An example graph 500 of τ versus the absolute value of median pressure peaks (e.g., negative pressure peaks) seen at t1, in response to an applied force, is shown in FIG. 5. The graph 500 presumes that a particular steady-state force is applied to the cover 202-2, and that the device 200 has a particular set of system parameters (e.g., sensor sensitivities; cover thickness, height, and weight; cover attachment parameters; cover material; and so on). As shown, the pressure peak (in Pascals (Pa)) is highest at τ=0.12 seconds (s), and drops steadily as τ decreases or increases from τ=0.12 s.

Other system parameters that may affect the pressures and displacements shown in FIGS. 4B and 4C include, for example, sensitivities of the pressure sensor 210 and capacitive force sensor 212.

The system parameters of a device may affect the magnitude and time-dependence of measurements produced by a pressure sensor or capacitive force sensor. Although a device may be calibrated for its system parameters at the time of manufacture and test, use of the device in the field, and over time, may lead to changes in the device's system parameters. If system parameters change and a device does not account for them, the device may indicate that a force input has been received when it has not, or fail to respond to an intended force input. When detecting a range of forces, as may be the case when a variable force input is used to control, for example, a speed of movement in a game application or the thickness of a paintbrush in a painting application, untracked changes in system parameters may lead to incorrect determinations of force, and thus incorrect speed or thickness settings. It may therefore be desirable to characterize or estimate system parameters in the field.

Described in FIGS. 6-11 are various methodologies for characterizing system parameters, and particularly τ, in the field. However, the methodologies may also be used during device test, before a device is released for use by an end user. Some of the methodologies for characterizing system parameters enable the determination of a discrete value for a system parameter. Other methodologies enable the value of a system parameter to be characterized as, for example, high, low, increasing, or decreasing.

A discrete value of τ may be determined in various ways. In some cases, τ may be determined using a time-dependent sequence of measurements obtained from a pressure sensor, and fitting the sequence of measurements to an exponential curve for a particular value of τ. In some cases, such a methodology may use pressure measurements obtained after liftoff of a force, as these measurements are not influenced by the application of the force but are dependent on system and ambient parameters.

In some cases, τ may be determined using a combination of time-dependent measurements obtained from a pressure sensor and a capacitive force sensor (or displacement measurements derived from the capacitive force sensor measurements). Using pressure and capacitance measurements enables a joint fit of pressure and capacitance measurements for a particular value of τ, and is dependent on the non-linear relationship between displacement and capacitance, which can improve accuracy over converting capacitance measurements to displacement measurements and jointly fitting pressure and displacement measurements to exponential curves for a particular value of τ. In some cases, both of the methodologies described in this paragraph may use pressure and capacitive (or displacement) measurements obtained after liftoff of a force, as these measurements are not influenced by the application of the force and are dependent on system and ambient parameters.

In some cases, τ may be determined using a combination of time-dependent measurements obtained from a pressure sensor and displacement measurements derived from a capacitive force sensor. In some cases, such a methodology may use measurements obtained during application of a force (e.g., during a touch period, such as between times t0 and t1 in FIGS. 4A-4C).

Figure 6:
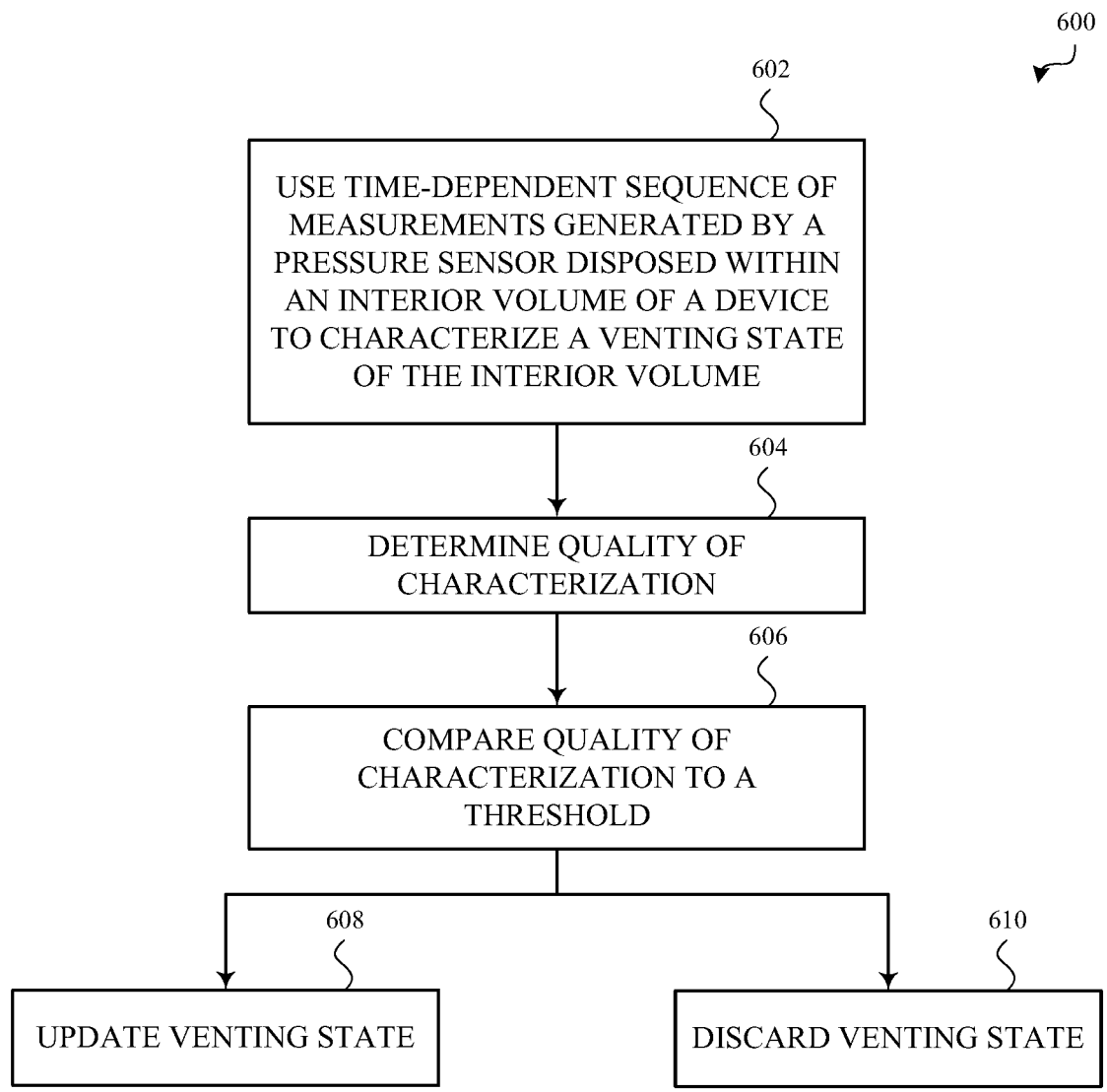
FIGS. 6-11 show various methodologies for characterizing system parameters, and particularly τ, in the field.

FIG. 6 shows an example method 600 for characterizing a venting state of a device with a discrete value. The operations included in the block diagram may in some cases be performed by a processor of the device.

At block 602, a time-dependent sequence of measurements generated by a pressure sensor disposed within an interior volume of the device (e.g., within the interior volume 204 of the device 200 described with reference to FIG. 2B) may be used to characterize a venting state of the interior volume. In some embodiments, the measurements may be measurements obtained during a liftoff period following liftoff of a force applied to the device (e.g., measurements obtained for the time period following time t1 in FIGS. 4A and 4B). In some cases, the operation(s) at block 602 may include fitting the time-dependent sequence of measurements to a curve associated with a discrete venting state (e.g., τ=0.2 s). In some embodiments, τ may be estimated using a non-linear least squares (LS) curve-fitting.

At block 604, a quality of the venting state characterization made at block 602 may be determined. In some embodiments, this may include determining a quality of a curve-fitting performed at block 602. For example, a coefficient of determination ($R^2$) may be determined.

At block 606, the quality of the characterization (or quality of the curve-fitting) may be compared to a threshold (TH). For example $R^2$ may be compared to TH, to determine whether $R^2$>TH. If the quality of the characterization (or curve-fitting) satisfies the threshold, the discrete venting state determined at block 602 may be used to update a stored system parameter of the device at block 608. Otherwise, the venting state determined at block 602 may be discarded at block 610.

In some cases, the methodology described with reference to FIG. 6 may be used upon certain preliminary conditions being met. For example, the described curve-fitting methodology may be performed after determining that the peak pressure of the applied and lifted off force (e.g., the peak pressure at t1) satisfies a threshold pressure, and that the liftoff period (i.e., the measurable time period between t1 and return of the pressure to a steady-state pressure) exceeds a threshold time period. These conditions ensure that the curve being fit has enough definition to provide adequate curve-fitting parameters. Another preliminary condition that may be met before using the methodology described with reference to FIG. 6 is a quiet sensor condition. The quiet sensor condition may be used to ensure that the curve being fit is distinguishable from noise with a high enough degree of certainty.

Figure 7:
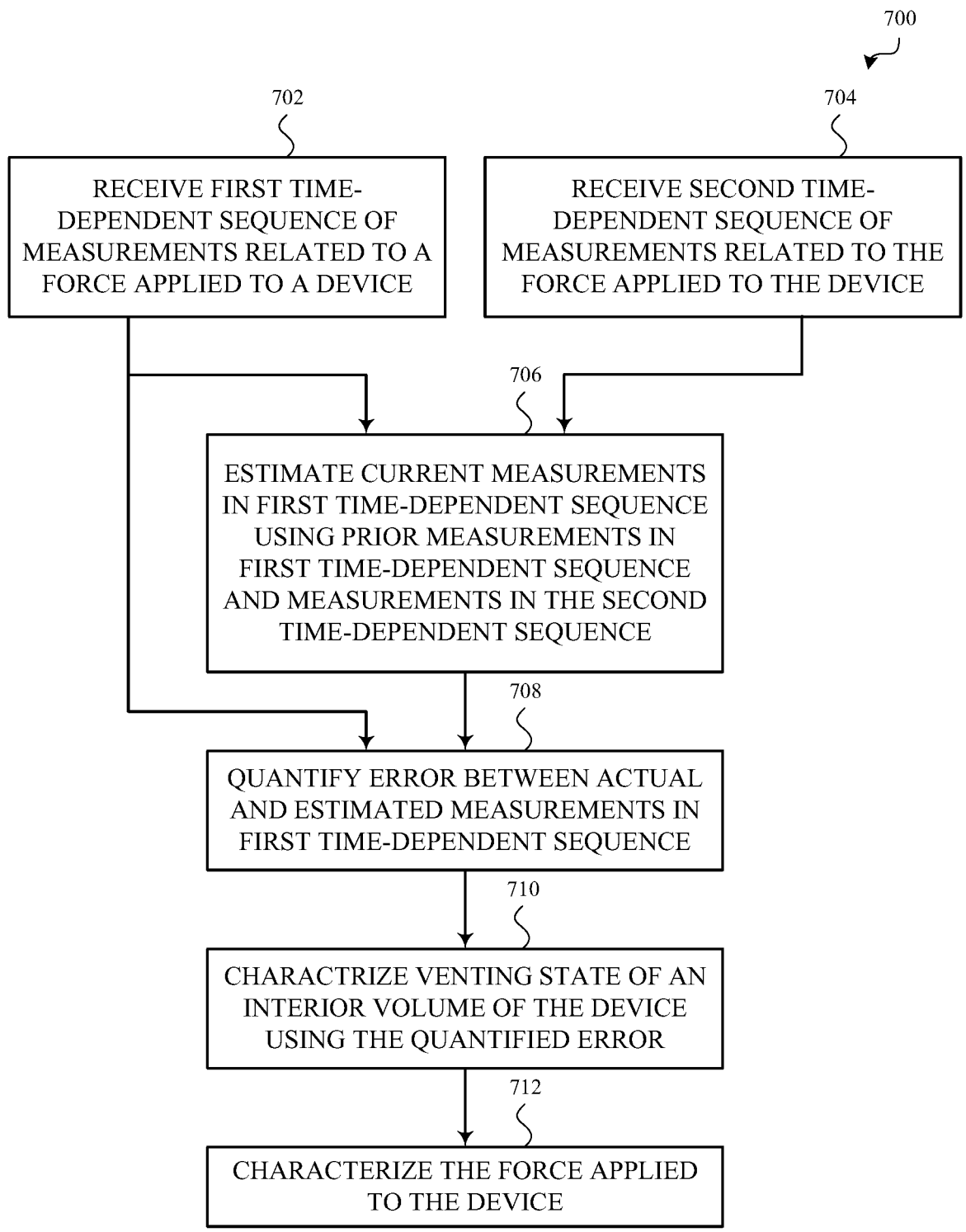

FIG. 7 shows an example method 700 for characterizing a venting state of a device, or another parameter of the device, with a discrete value. The operations included in the block diagram may in some cases be performed by a processor of the device.

At block 702, a first time-dependent sequence of measurements related to a force applied to the device may be received (e.g., by the processor). The first time-dependent sequence of measurements may be generated by a first type of force sensor (e.g., a capacitive force sensor).

At block 704, a second time-dependent sequence of measurements related to the force may be received (e.g., by the processor). The second time-dependent sequence of measurements may be generated by a second type of force sensor (e.g., a pressure sensor). In some cases, the method 700 may include configuring the first and second type of force sensors to generate the first and second time-dependent sequences of measurements. In some cases, configuring the first and second type of force sensors may simply include powering or enabling the force sensors. Because the force sensors are configured to generate measurements for the same applied force, the force sensors may generate their measurements in parallel (e.g., at the same time or about the same time). The generated measurements may include digitized samples of analog measurement signals.

At block 706, the method 700 may include estimating current measurements in the first time-dependent sequence of measurements using 1) prior measurements in the first time-dependent sequence of measurements, and 2) measurements in the second time-dependent sequence of measurements. The measurements used from the second time-dependent sequence of measurements may include current and past measurements. In some embodiments, the measurements used at block 706 may be limited to measurements generated during application of the force applied to the device (e.g., measurements generated between times t0 and t1 in FIGS. 4A-4C). Measurements occurring after t1 are dependent on system parameters, but are not directly dependent on the applied force, and the operations at blocks 708-710 are ideally performed in relation to measurements that are directly dependent on the applied force.

At block 708, the method 700 may include quantifying an error between the (actual) measurements in the first time-dependent sequence of measurements and the estimated current measurements in the first time-dependent sequence of measurement.

At block 710, the method 700 may include characterizing (e.g., estimating) the venting state of an interior volume of the device (e.g., the interior volume 204 of the device 200 described with reference to FIG. 2B) using the quantified error. In some embodiments, the operation(s) at block 710 may include identifying a venting state that minimizes the quantified error.

At block 712, the method 700 may optionally include characterizing (e.g., estimating an amount of) the force applied to the device using the venting state and at least one of the first time-dependent sequence of measurements or the second time-dependent sequence of measurements.

In some embodiments, current measurements in the first time-dependent sequence of measurements may be estimated over other parameters of the device, such as other parameters (e.g., system parameters) affecting at least one of the first time-dependent sequence of measurements or the second time-dependent sequence of measurements. The error between the measurements in the first time-dependent sequence of measurements and the estimated current measurements in the first time-dependent sequence of measurements may then be quantified and used to estimate one or more of the other parameters. These other parameters may be used in addition to or instead of the venting state to evaluate the force applied to the device.

The other parameters referenced in the preceding paragraph may include, for example, a steady-state sensitivity of the first type of force sensor to force applied to the device, a steady-state sensitivity of the second type of force sensor to force applied to the device, or a relative sensitivity between the steady-state sensitivity of the first type of force sensor to force applied to the device and the steady-state sensitivity of the second type of force sensor to force applied to the device. The other parameters may also or alternatively include a uniform load sensitivity of a capacitive force sensor.

In some cases, blocks 706-712 of the method 700 may only be performed after determining one or more precursor conditions are met. The precursor conditions may include, for example, the availability of measurements that satisfy a threshold (e.g., peak measurements in the first time-dependent sequence of measurements that satisfy a first threshold, or peak measurements in the second time-dependent sequence of measurements that satisfy a second threshold); the availability of measurements over a minimum time period; or the availability of measurements that satisfy a minimum signal-to-noise ratio.

In some embodiments of the method, the first type of force sensor may alternatively be a pressure sensor and the second type of force sensor may alternatively be a capacitive force sensor. The method 700 differs from the method 600, in part, in that it characterizes the venting state of a device using a combination of measurements obtained from first and second types of force sensors (e.g., a capacitive force sensor and a pressure sensor). The method 700 also differs from the method 600 in that it uses measurements obtained from first and second types of force sensors during application of a force to a device (instead of after liftoff of the force).

Figure 8:
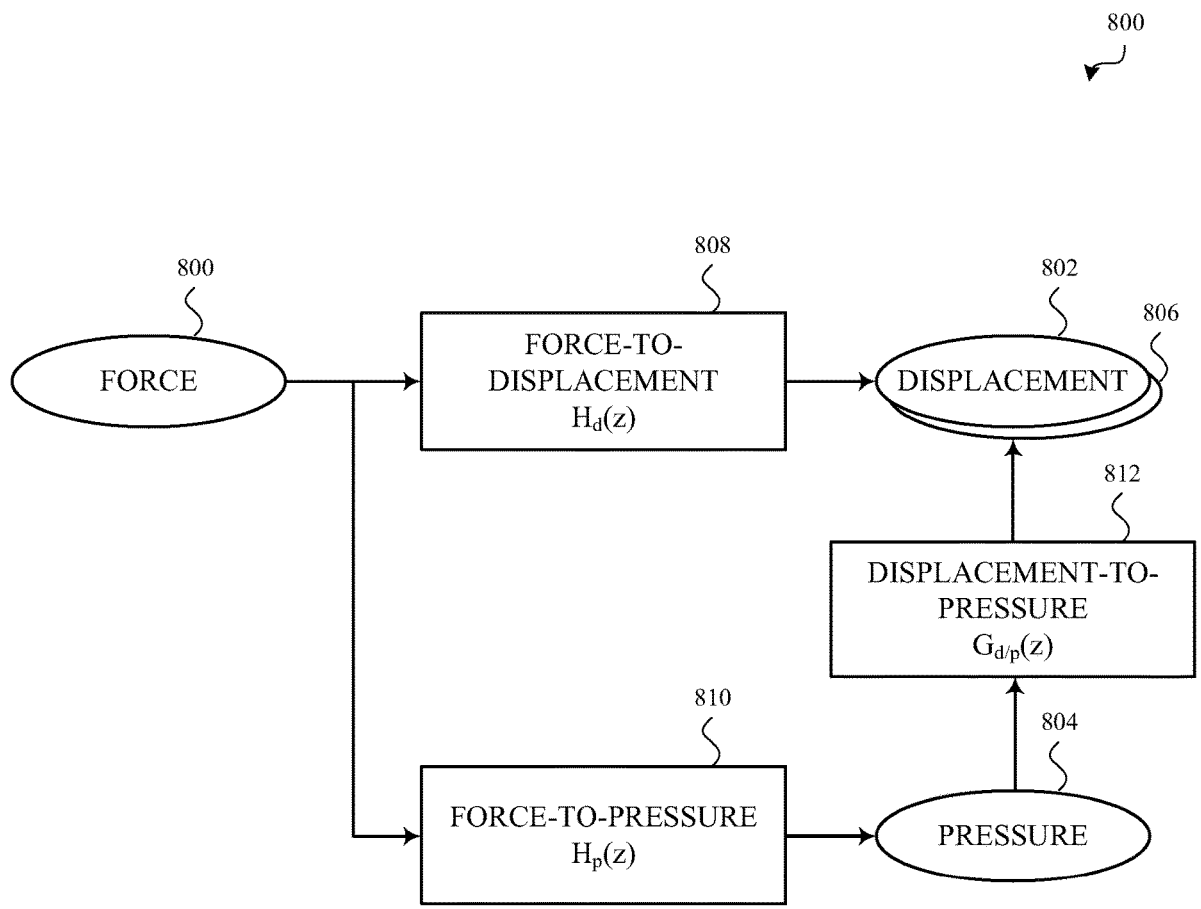

FIG. 8 shows relationships between a force 800 applied to a device, measurements of displacement 802 derived from a capacitive force sensor positioned in or in relation to an interior volume of the device, measurements of pressure 806 derived from a pressure sensor positioned within the interior volume, and estimates of displacement 806 derived from the measurements of pressure. The relationships shown in FIG. 8 may be used to estimate the current measurements, to quantify the error, and to estimate the parameter in blocks 706-710 of method 700.

In some embodiments, the device, capacitive force sensor, pressure sensor, and interior volume may be configured as described with reference to FIGS. 2B and 3A-3E, or similarly.

As shown, the measured displacement 802 may be related to the applied force 800 by a force-to-displacement transfer function $H_d(z)$ 808, the measured pressure 804 may be related to the applied force 800 by the force-to-pressure transfer function $H_p(z)$ 810, and the estimated displacement 806 may be related to the measured pressure 804 by the displacement-to-pressure transfer function $G_{d/p}(z)$ 812. Each of the transfer functions may depend on various system parameters, such as $\tau$; a steady-state sensitivity ($S_{ss}^{(x,y)}$) of a sensor (e.g., a capacitive force sensor) that measures displacement (or capacitance) in response to a force applied to the device; a steady-state sensitivity ($S_{p2}^{(x,y)}$) of a sensor (e.g., a pressure sensor) that measures pressure in response to a force applied to the device; and/or a relative sensitivity $$\left(S_r^{(x,y)} = \frac{S_{ss}^{(x,y)}}{S_{p2}^{(x,y)}}\right)$$

between the steady-state sensitivity of the capacitive force sensor and the steady-state sensitivity of the pressure sensor. The steady-state sensitivity of a capacitive force sensor may be characterized in terms of the steady-state displacement seen at the sensor's location from each gram Force (gF) of applied force at a touch location on a device (e.g., Nanometer/gF=nm/gF), assuming steady-state displacement or zero τ for an interior volume of the device. The steady-state sensitivity of a pressure sensor may be characterized in terms of a steady-state pressure change in the interior volume from each gF of applied force at the touch location (e.g., Pascal/gF=pa/gF).

A displacement measurement may be estimated using pressure measurements and past displacement measurements, or a pressure measurement may be estimated using past displacement measurements and past pressure measurements, at any point in time. The estimation may be simpler when each of the transfer functions $H_d(z)$, $H_p(z)$, and $G_{d/p}(z)$ have the same poles between application and removal of a force to a device (e.g., between times t0 and t1 in FIGS. 4A-4C). Under ideal conditions (e.g., known values of system parameters and no coexistence issues caused by ambient noise (e.g., ambient pressure change) or internal noise (e.g., heat, or electrical or magnetic noise), estimated measurements such as the estimated displacement measurements should equal the actual displacement measurements. Under non-ideal conditions, the difference (or error) between estimated measurements and actual measurements can be quantified (and minimized) as follows:

$$\min \left\| \begin{bmatrix} d(n) \\ \vdots \\ d(0) \end{bmatrix} - \begin{bmatrix} \hat{d}(n) \\ \vdots \\ \hat{d}(0) \end{bmatrix} \right\|^2$$

where d(n) corresponds to the actual displacement and $\hat{d}(n)$ corresponds to the displacement estimated from pressure.

The above error may be quantified (e.g., minimized) across various system parameters to solve for the system parameters. In this manner, values of the system parameters may be determined in the field, and formulas that use the system parameters to characterize a force applied to a device may be updated to use current values of system parameters. Also or alternatively, an appropriate methodology for determining the amount of force applied to a device may be selected. For example, different methodologies may be used to characterize the force applied to a low τ, medium τ, or high τ device.

The error between measured (d) and estimated ($\hat{d}$) displacement values may be minimized across τ as follows:

$$\tau^* = \arg \min_\tau \left\| \begin{bmatrix} d(n) \\ \vdots \\ d(0) \end{bmatrix} - \begin{bmatrix} \hat{d}(n) \\ \vdots \\ \hat{d}(0) \end{bmatrix} \right\|^2$$

which in some cases has a closed form solution. Other system parameters may be estimated in a similar manner.

The error between measured (d) and estimated ($\hat{d}$) displacement values may be minimized over a single system parameter or multiple system parameters. For example, a parameter of a device may be jointly estimated or optimized with a second parameter of the device, as a bi-convex problem, using the error that is quantified by minimizing the error between measured/actual (d) and estimated ($\hat{d}$) displacement values. Jointly minimizing the error between measured (d) and estimated ($\hat{d}$) displacement values, over multiple system parameters, can improve the reliability of resultant parameter estimates, but at the expense of an increasingly more significant processing burden.

In some embodiments, sensor sensitivities may be estimated for each location of a touch (i.e., each touch location, or each location at which a force is applied) on a device (e.g., for each touch location on a cover of the device). A sensor's sensitivity may differ for different touch locations, and a sensor's sensitivity may generally decrease for touch locations that are more distant from the sensor's location. In general, the sensitivity of a capacitive force sensor may vary more with respect to touch location than the sensitivity of a pressure sensor may vary with respect to touch location.

Figure 9:
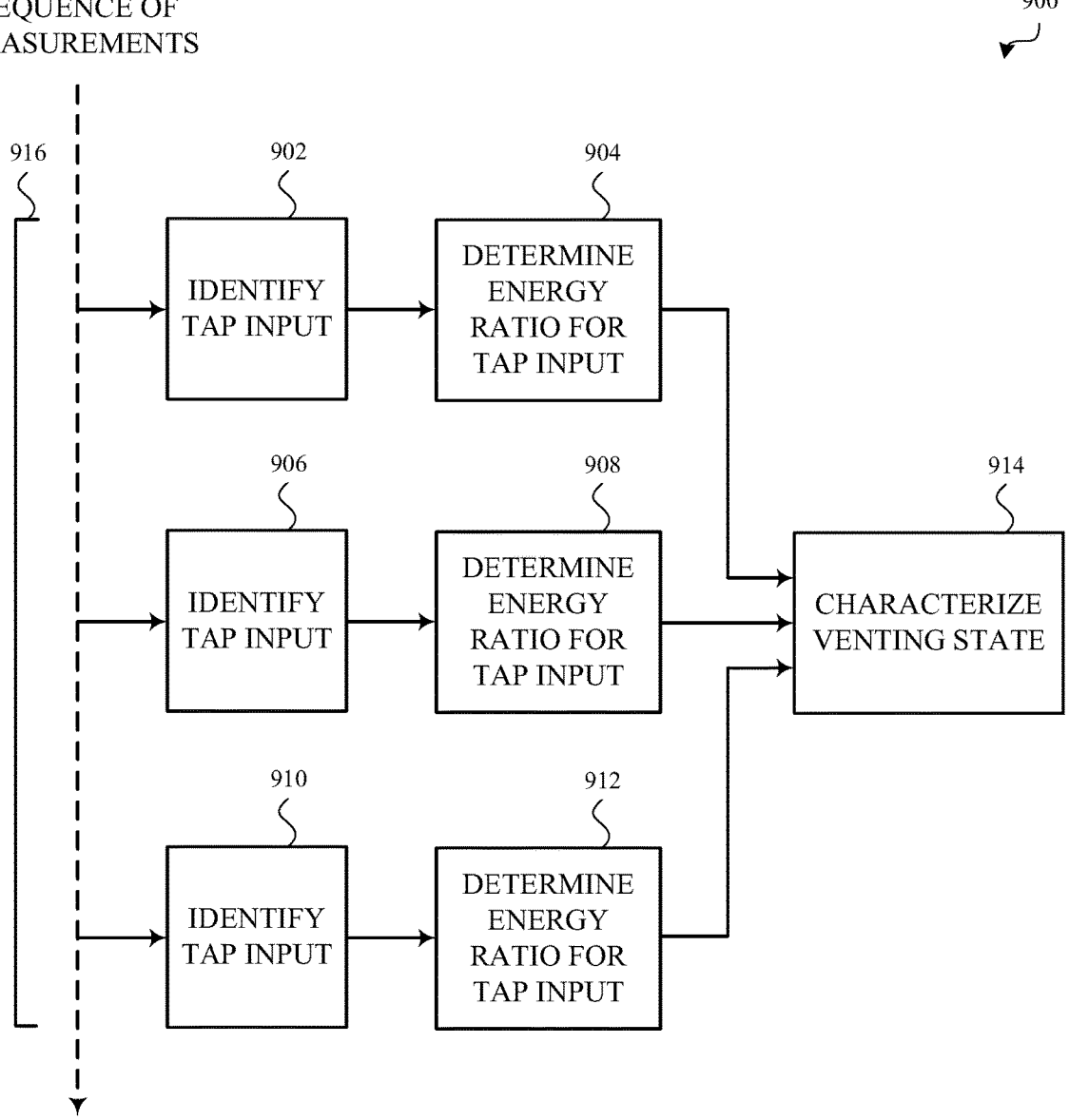
Figure 10:
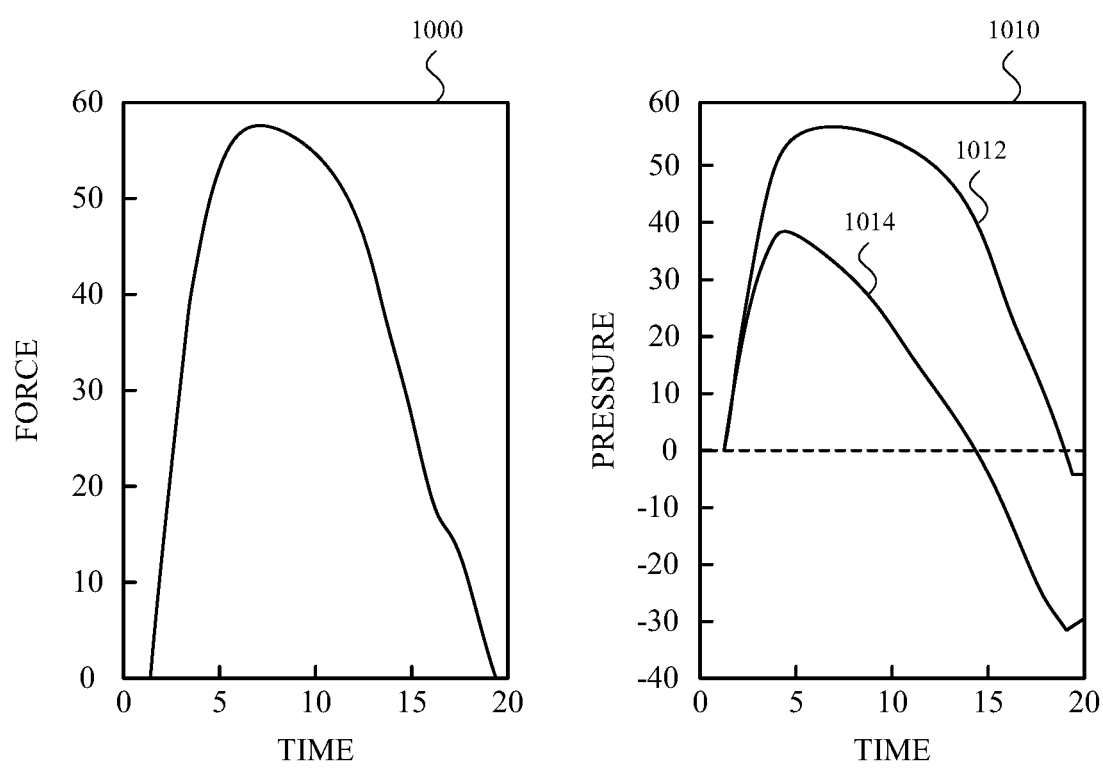

FIG. 9 is a block diagram 900 showing another example methodology for characterizing a venting state of a device. The operations included in the block diagram may in some cases be performed by a processor of the device.

At one or more of blocks 902, 906, or 910, a tap input on a surface of the device may be identified. In some cases, only one tap may be identified. In other cases, two, three, or any number of tap inputs (e.g., a set of tap inputs) may be identified. The receipt and identification of more tap inputs may increase the accuracy of venting state characterization, but at the expense of an increased processing load or time delay. In some cases, tap inputs may include keystrokes or button presses made by a user of the device.

A tap input may be identified from a time-dependent sequence of measurements generated by a pressure sensor disposed within an interior volume of the device (e.g., within the interior volume 204 of the device 200 described with reference to FIG. 2B). In some embodiments, a tap may be identified when a maximum pressure (or peak pressure) associated with the tap input satisfies (e.g., exceeds) a pressure threshold. Inputs having a peak pressure that does not satisfy (e.g., exceed) the pressure threshold may be ignored as not being distinguishable from noise and/or not having sufficient pressure to adequately determine characteristics of the input. In some embodiments, a tap input may be identified from a change in pressure profile that matches an expected change in pressure profile of a tap input. In some embodiments, a tap input may be additionally identified based on the presence of a touch input. For example, a tap input may be identified when a touch sensor indicates the presence of a touch input, and when a peak pressure measured during the touch input satisfies a pressure threshold. In some cases, the identification of a tap input may also be conditioned on the touch input not exceeding a maximum duration threshold, which may indicate the presence of a touch that is too long to be considered a tap.

At one or more of blocks 904, 908, or 912, the time-dependent sequence of measurements generated by the pressure sensor may be used to determine an energy ratio for an identified tap input. The determination of an example energy ratio is illustrated with reference to FIG. 10, which shows corresponding graphs of force and pressure over time. A first graph 1000 shows an example force profile for a tap input. A second graph 1010 shows first and second example pressure profiles corresponding to the force profile. The first pressure profile 1012 is for a device having a relatively well-sealed and/or slowly vented interior volume (e.g., an interior volume having a relatively higher value of τ, or a τ having a value that is greater than the duration of the tap input), and the second pressure profile 1014 is for a device having a somewhat leaky and more rapidly vented interior volume (e.g., an interior volume having a relatively lower value of τ, or a τ having a value that is less than the duration of the tap input). Pressure measurements (e.g., samples) taken along the first pressure profile 1012 indicate an increased pressure (e.g., are positive) for the duration of the tap input. Thus, when the tap input associated with the first graph 1000 has the first pressure profile 1012, the energy ratio for the tap input may be considered 1.0 (i.e., 100% of the pressure measurements are associated with a positive pressure increase). Pressure measurements (e.g., samples) taken along the second pressure profile 1014 indicate a positive pressure for only part of the tap input, and indicate a negative pressure for the last part of the tap input. Thus, when the tap input associated with the graph 1000 has the second pressure profile 1014, the energy ratio for the tap input may be 0.75 (i.e., 75% of the pressure measurements are associated with a pressure increase).

In some embodiments, the energy ratio for a tap input may be determined differently. For example, the area of a pressure profile above a baseline value (e.g., 0 pressure in the second graph 1010) may be compared to the sum of the area of the pressure profile above the baseline value and the area of the pressure profile below the baseline value.

At block 914, the venting state of the device may be characterized using the energy ratio(s) for the identified tap inputs. In some embodiments, the venting state may be characterized by combining (e.g., averaging) the energy ratios for two, three, or more tap inputs. In some embodiments, energy ratios for different tap inputs may only be combined when the tap inputs occur within a predetermined time period 916 or with no more than a maximum delay between tap inputs. In some cases, the venting state may be characterized by comparing a current venting state to a previously determined venting state, to determine whether τ has changed (e.g., increased, decreased, or stayed the same). Such a comparison may be made by comparing energy ratios for the current and previous venting states.

Figure 11:
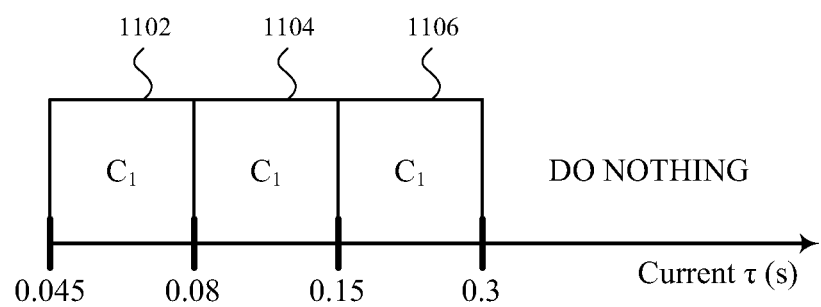

Whether τ is characterized at block 914 in terms of a discrete value, or as being within a range of values, or as increasing or decreasing, or as increasing or decreasing by more than a particular threshold, the current value of τ may be updated when it is determined at block 914 that τ has changed (or changed more than a threshold amount). In some cases, an increase or decrease in τ, or an increase or decrease of more than a threshold amount, or an increase or decrease from a particular prior value of τ, may trigger one of a number of different rules for updating τ. (e.g., there may be different thresholds and/or different threshold amounts). For example, FIG. 11 shows three different rules 1102, 1104, 1106 for increasing τ. Each rule may be applied when a previously determined value of τ is within a range of τ values that trigger application of the rule, and when τ has been characterized as increasing from the previously determined value.

Figure 12:
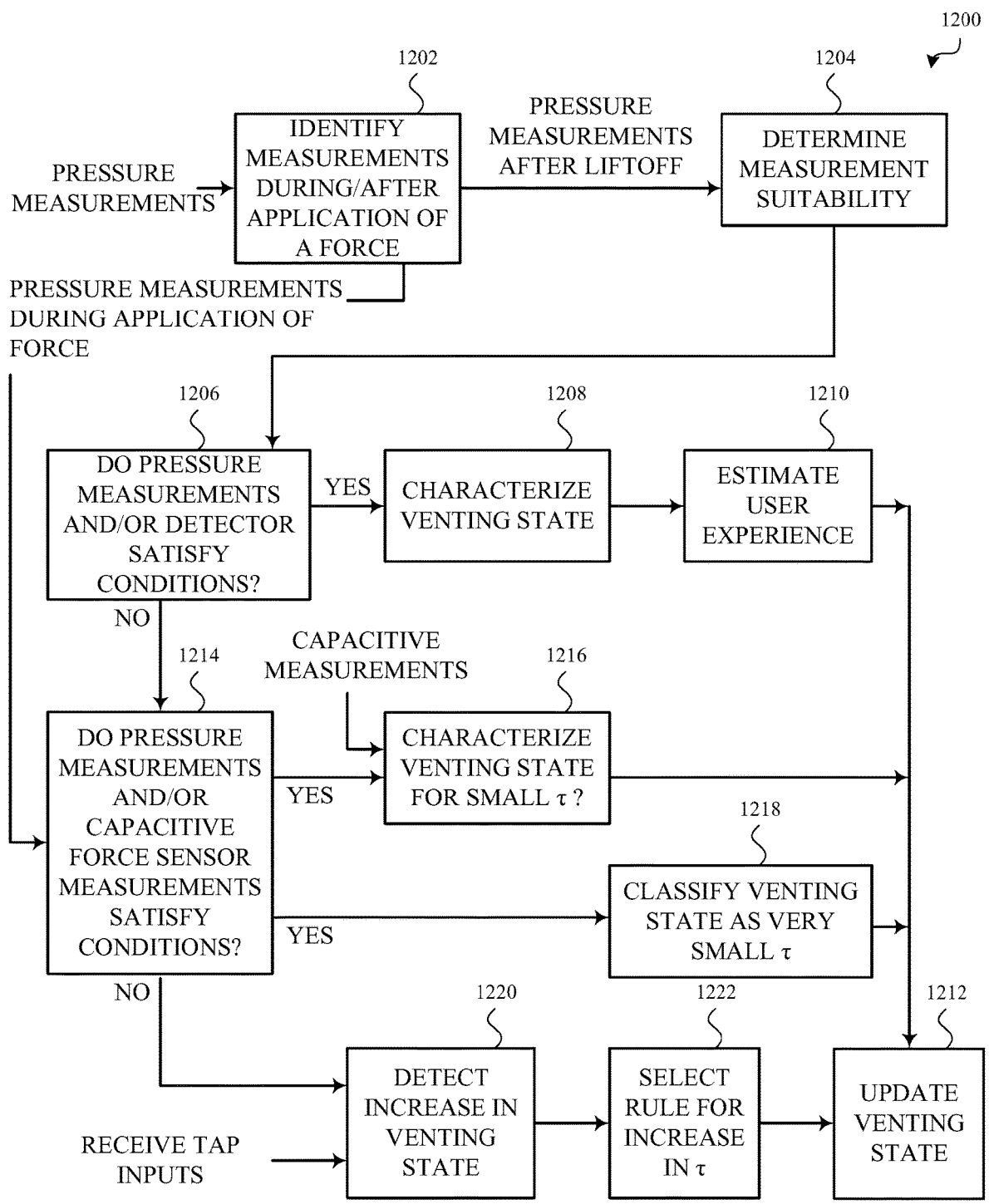
FIGS. 12 and 13 show decision trees for characterizing the venting state of a device.
Figure 13:
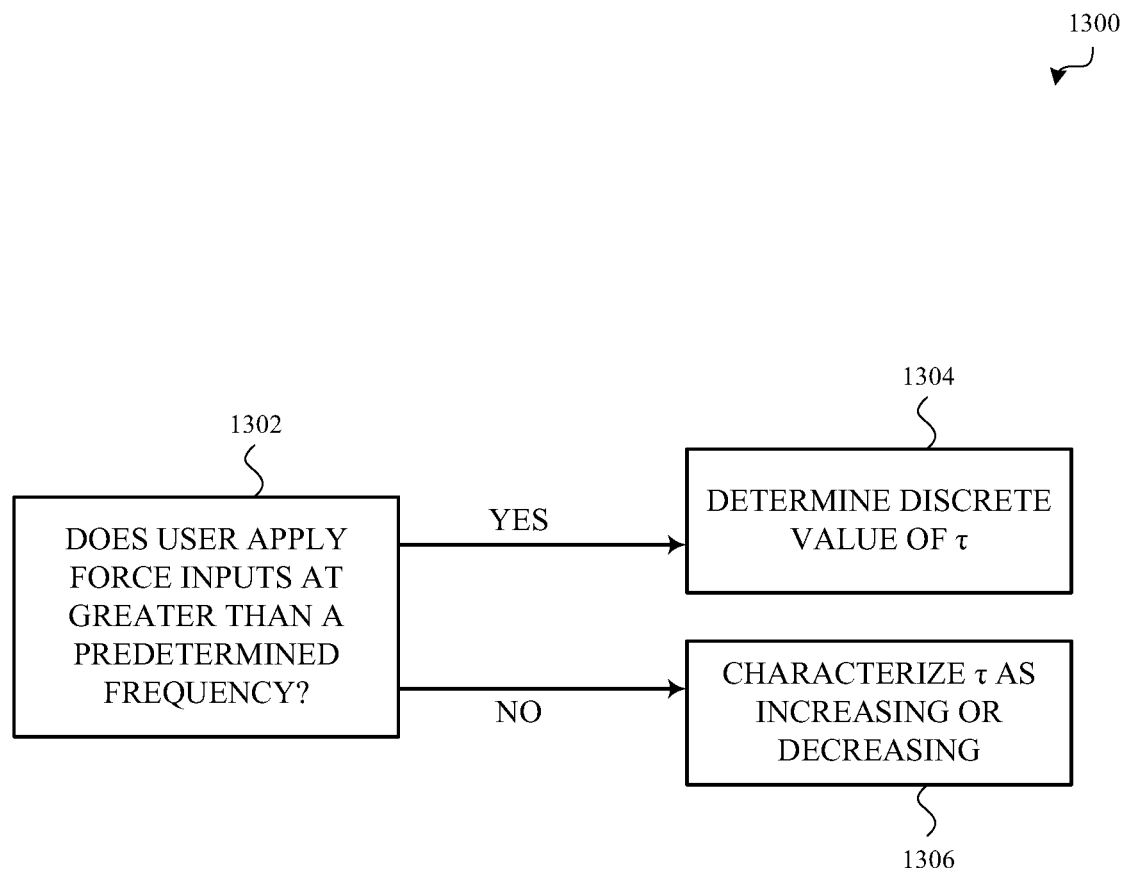

FIGS. 12 and 13 show decision trees for characterizing the venting state of a device. The decision trees may be implemented separately or in combination, and enable a device to determine a venting state of an interior volume of the device in different ways, depending on the measurements obtained from a pressure sensor and/or capacitive force sensor satisfy particular parameters (e.g., depending on whether the measurements satisfy one or more thresholds or durations, or relationships), or depending on how a user is using a device (e.g., depending on whether a user is providing force inputs or simply typing or tapping on the device), or depending on previously determined system parameters of the device (e.g., a previously determined venting state, pressure sensor sensitivity, or capacitive force sensor sensitivity).

FIG. 12 shows a decision tree 1200 for characterizing a venting state of a device using a first time-dependent sequence of measurements obtained from a pressure sensor mounted within an interior volume of a device, and in some cases a second time-dependent sequence of measurements obtained from a capacitive force sensor configured to measure distortion (or displacement) of the interior volume. The operations included in the decision tree may in some cases be performed by a processor of the device.

At block 1202, the time-dependent sequence of measurements generated by the pressure sensor (pressure measurements) may be processed to identify subsets of measurements occurring during application of a force to the device and/or after liftoff of the force. In some cases, the application of a force may be identified by an increase in pressure (e.g., a spike in pressure exceeding a threshold amount). In some cases, the start of liftoff may be identified by a pressure reversal and/or a touch sensor's indication that an object (e.g., a user or stylus) is no longer touching a surface of the device (e.g., a cover over a display).

At block 1204, the suitability of using the measurements for determining system parameters may be determined. For example, it may be determined whether certain environmental conditions may be affecting the measurements, and if so, the measurements may not be used for determining system parameters. In some cases, measurements generated by the pressure sensor, during or after liftoff of the force, may be processed to determine whether environmental conditions may exist and/or are affecting the measurements. For example, the existence of environmental conditions may be identified by fluctuations in the measurements. The existence of certain environmental conditions may also be determined from fluctuations in an ambient pressure (or barometric pressure) of the device, or from a different or fluctuating ratio of ambient and internal pressure measurements. In some embodiments, certain changes in measurements, changes in ratios of measurements, or patterns of fluctuating measurements may suggest that a device is being used in an elevator, on a high-speed train, in a car with an open window, under water, while or shortly after a door is slammed, and so on.

The measurement suitability determination made at block 1204 may also or alternatively depend on whether a previously determined venting state (a venting state baseline) or other system parameter is out-of-date. In some cases, an out-of-date venting state baseline may be a baseline that is more than a minute old. When it is determined that both a predetermined environmental condition exists, or that the venting state baseline is out-of-date, the device may refrain from further processing pressure measurements obtained for a most recently applied force.

At block 1206, the identified time-dependent sequence of measurements generated by the pressure sensor, after liftoff of the force, may be processed to determine whether a force applied to and lifted off of the device has a pressure peak (or peak pressure) that satisfies (e.g., exceeds) a first threshold pressure. Also or alternatively, the operations at block 1206 may include determining whether the force has a liftoff period that satisfies a threshold (e.g., a threshold liftoff period, or period of time during which the measurements satisfy (e.g., exceed) a second threshold pressure that is lower than the first threshold pressure). Also or alternatively, the operations at block 1206 may include determining whether the noise floor of the pressure detector is below a third threshold pressure, indicating a "quiet detector." When the determinations made at block 1206 are all determined to be true, the operation(s) at block 1208 may be performed. Otherwise, the operation(s) at block 1214 may be performed.

At block 1208, the methodology described with reference to FIG. 6 may be performed to characterize (e.g., estimate a discrete value of) the venting state of the interior volume. At block 1210, it may be optionally determined whether an estimate of the venting state determined at block 1208 provides a good user experience. At block 1212, the venting state of the interior volume may be updated using the estimate of the venting state determined at block 1208.

At block 1214, the identified time-dependent sequence of measurements generated by the pressure sensor, during application of the force or after liftoff of the force, may be processed to determine whether a force applied to and lifted off of the device has a pressure peak (or peak pressure) that satisfies (e.g., exceeds) a fourth threshold pressure, lower than the first threshold pressure described with reference to block 1206. Also or alternatively, the operations at block 1214 may include determining whether the second time-dependent sequence of measurements indicate displacement of a surface of the device (or displacement of the interior volume) that is less than a threshold amount (e.g., not too great, indicating that the capacitive force sensor has bottomed out or that the interior volume has little or no seal). When the determinations made at block 1214 are all determined to be true, the operation(s) at block 1216 may be performed. Otherwise, the operation(s) at bock 1220 may be performed.

At block 1216, the methodology described with reference to FIG. 7 may be performed to characterize the venting state of the interior volume. At block 1212, the venting state of the interior volume may be updated responsive to the characterization of the venting state at block 1216.

Alternatively or additionally, the operations at block 1214 may include determining whether the second time-dependent sequence of measurements indicate displacement of the interior volume that is more than the threshold amount (e.g., great enough to indicate that the capacitive force sensor has bottomed out or that the interior volume has little or no seal). When this determination is determined to be true, the operation(s) at block 1216 may be bypassed and it may be determined at block 1218 that the venting state of the interior volume is associated with a very small τ. At block 1212, the venting state of the interior volume may be updated to reflect that the venting state of the interior volume is very small, or that the interior volume is not sealed. In such a case, an amount of force applied to the device may be estimated using the time-dependent sequence of measurements generated by the capacitive force sensor, and not the time-dependent sequence of measurements generated by the pressure sensor.

At blocks 1220 and 1222, the methodology described with reference to FIG. 9 may be performed to characterize the venting state of the interior volume. In some embodiments, it may be determined at block 1220 whether τ has increased, but a rule such as one of the rules described with reference to FIG. 11 may only be executed when the increase in τ is determined to exceed a threshold increase at block 1222. When τ does exceed the threshold increase, τ may be updated at block 1212.

FIG. 13 shows a decision tree 1300 for characterizing a venting state of a device using a time-dependent sequence of measurements obtained from a pressure sensor mounted within an interior volume of a device. The operations included in the decision tree may in some cases be performed by a processor of the device.

At block 1302, it may be determined whether a user of the device applies force inputs (e.g., button presses or force-dependent gestures) to the device at a frequency greater than a predetermined frequency. If so, the venting state of the device may be characterized at block 1304 by determining a discrete value of τ. Otherwise, the venting state of the device may be characterized, at block 1306, as increasing or decreasing.

In some embodiments, the operations at block 1304 may include performing the methodology described with reference to FIG. 7 to characterize the venting state. In some embodiments, the operations at block 1306 may include performing the methodology described with reference to FIG. 9 to characterize the venting state.

Figure 14A:
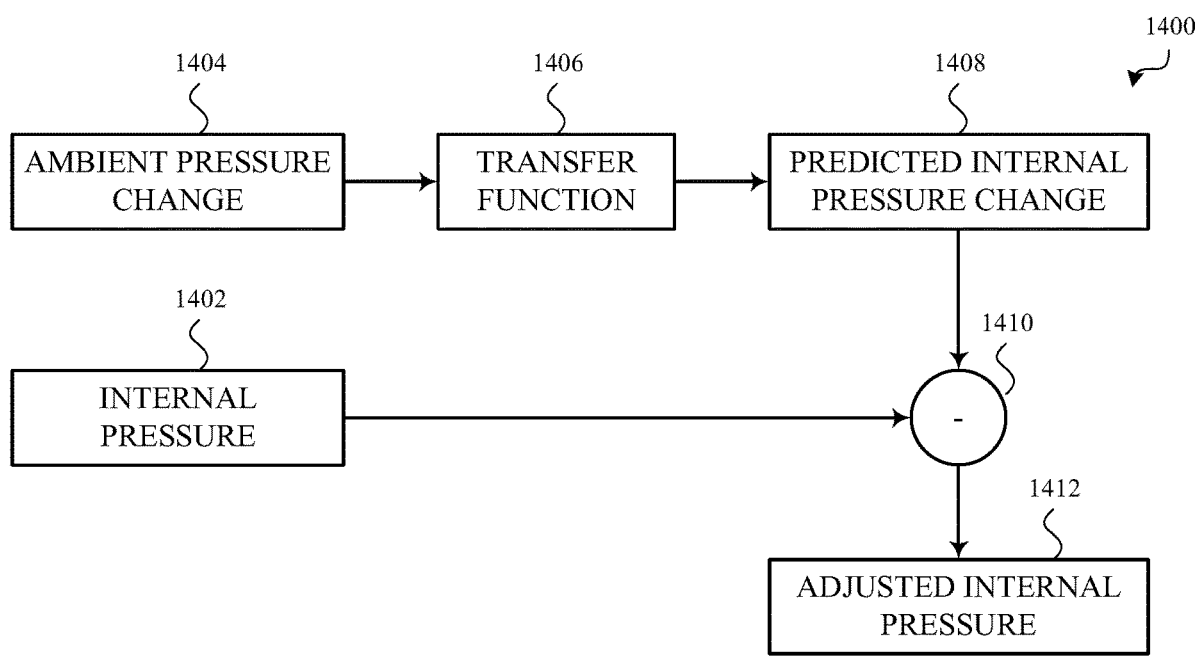
FIGS. 14A and 14B show examples of how a measurement of internal pressure may be adjusted using a measurement of barometric or ambient pressure.
Figure 14B:
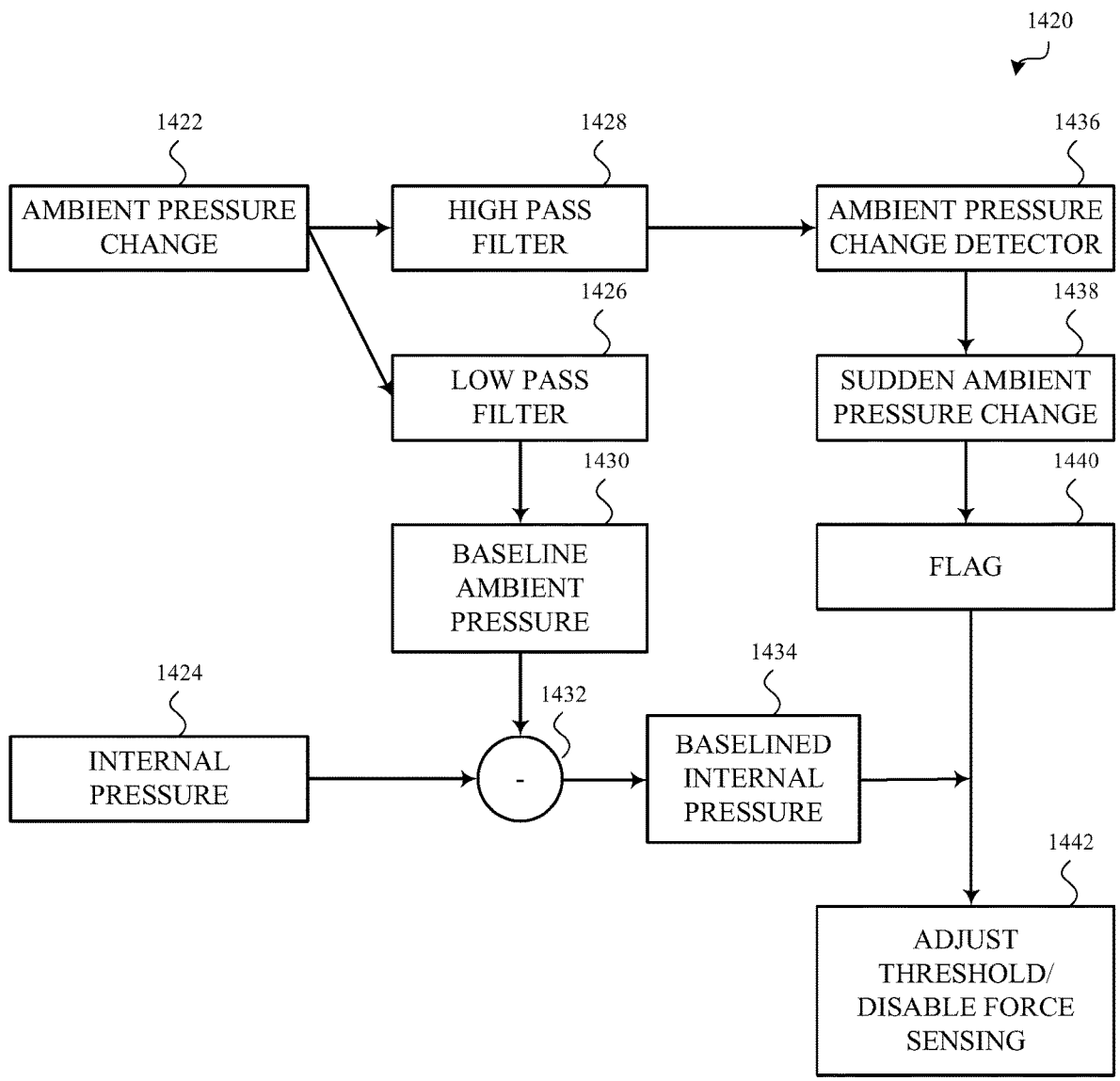

FIGS. 14A and 14B show examples of how a measurement of internal pressure (e.g., a measurement obtained from the internal pressure sensor 210 described with reference to FIG. 2B) may be adjusted using a measurement of barometric or ambient pressure (e.g., a measurement obtained from the barometric pressure sensor 222). The process flows described with reference to FIGS. 14A and 14B may be implemented using a processor or other circuit, and may use measurements obtained from an internal pressure sensor 210 and barometric pressure sensor 222 as inputs. For ease of explanation, the process flows shown in FIGS. 14A and 14B are described with reference to the device 200 shown in FIG. 2B.

In the flow 1400 shown in FIG. 14A, a measurement of the pressure within a device's interior volume 204 may be obtained at block 1402, and a measurement of the ambient pressure of the device 200 may be obtained at block 1404. In some embodiments, the measurements may be correlated in time (e.g., the measurements may be obtained at the same or approximately same time). In some cases, each of the measurements may be acquired as a time varying measurement (e.g., $P_1(t)$ and $P_2(t)$). At block 1404, a change in ambient pressure may be identified. In some embodiments, the change may be a change that exceeds a predetermined threshold (e.g., a change that causes the ambient pressure to exceed a threshold ambient pressure, or a change in ambient pressure that exceeds a predetermined ambient pressure change threshold or a predetermined percentage change in ambient pressure). In response to identifying the change in ambient pressure, a processor may use a transfer function 1406 to determine how the change in ambient pressure may affect the internal pressure, and may estimate (or predict) an internal pressure change 1408 that is likely to occur in response to the ambient pressure change. At block 1410, the processor may subtract the estimated internal pressure change from the measured internal pressure to yield an adjusted internal pressure 1412.

The flow described with reference to FIG. 14A may be considered a full differential adjustment flow. FIG. 14B shows a partial differential adjustment flow. Turning now to FIG. 14B, a flow 1420 is shown in which measurements of internal pressure and ambient pressure may be obtained, at blocks 1422 and 1424, as described with reference to FIG. 14A. The ambient pressure measurement may be separately processed by a low pass filter 1426 and a high pass filter 1428. The low pass filtered measurement may be used to determine a baseline ambient pressure 1430, which baseline ambient pressure 1430 may be combined with (e.g., subtracted from) the internal pressure measurement at block 1432 to yield a baselined internal pressure 1434. The high pass filtered measurement may be used by an ambient pressure change detector 1436 to identify a sudden ambient pressure change at block 1438, which sudden ambient pressure change may be flagged at block 1440 and used to increase the force detection threshold to which the measured and baseline-adjusted internal pressure 1434 is compared to determine whether an amount of force applied to the cover 202-2 is sufficient to trigger an action, or to temporarily disable force sensing functionality, or take other actions at block 1442.

Figure 15:
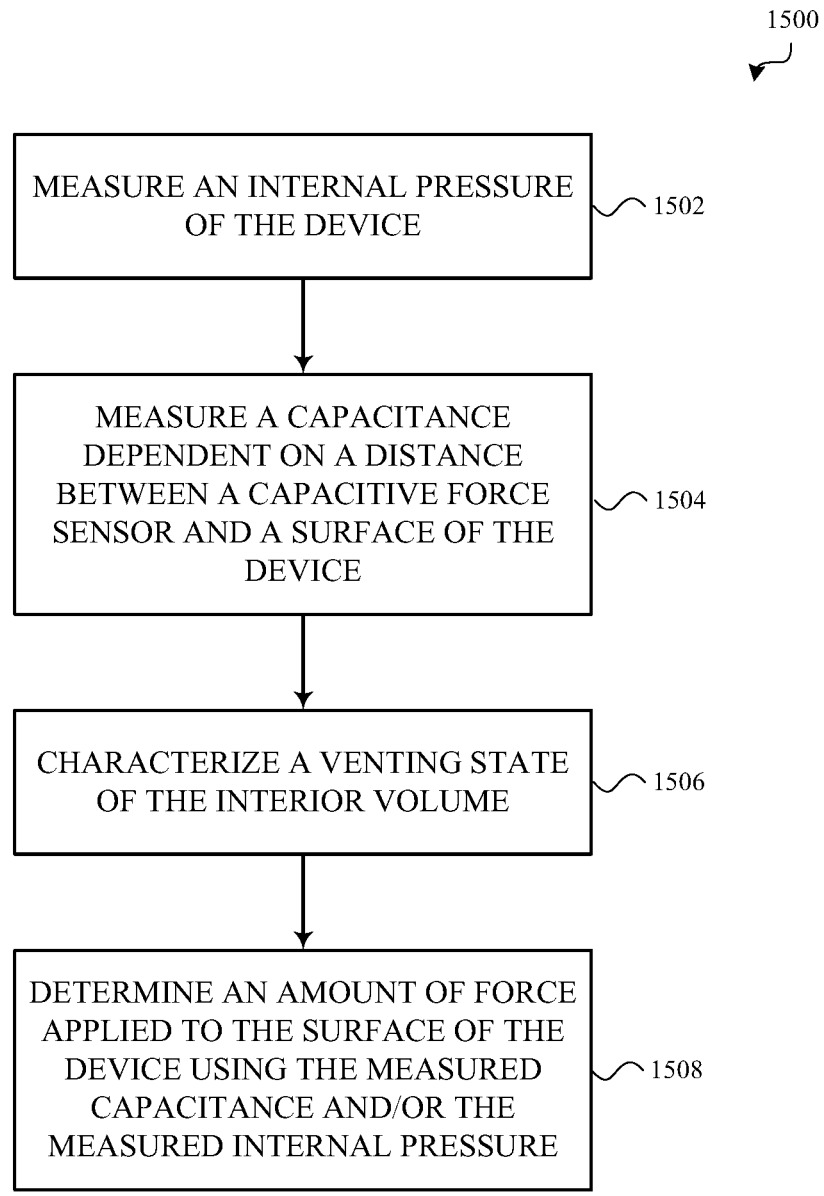
FIG. 15 shows an example method of determining an amount of force applied to a device.

FIG. 15 shows an example method 1500 of determining an amount of force applied to a device (e.g., to a cover of the device).

At block 1502, the method 1500 may include measuring an internal pressure of the device. In some embodiments, the internal pressure may be measured using a pressure sensor disposed within a volume interior to the device. The pressure sensor may be configured to generate a first time-dependent sequence of measurements related to the amount of force applied to the device.

At block 1504, the method 1500 may optionally include measuring a capacitance that is dependent on a distance between a capacitive force sensor and a surface (e.g., the cover) of the device. In some embodiments, the capacitance may be measured using a capacitive force sensor disposed within the interior volume, or otherwise disposed to measure distortion (e.g., displacement) of the interior volume. The capacitive force sensor may be configured to generate a second time-dependent sequence of measurements related to an amount of force applied to the device.

At block 1506, the method 1500 may include characterizing a venting state of the interior volume and/or characterizing another system parameter of the device. The venting state may be characterized using at least the first time-dependent sequence of measurements, as described with any of FIGS. 6-13.

At block 1508, the method 1500 may include determining an amount of force applied to the surface of the device, using the first time-dependent sequence of measurements and/or the second time-dependent sequence of measurements. The amount of force may be determined by a processor that uses a set of measurements selected from at least one of the first time-dependent sequence of measurements or the second time-dependent sequence of measurements. In some embodiments, the processor may use the characterization of the venting state to select measurements from the first time-dependent sequence of measurements and/or the second time-dependent sequence of measurements for determining the amount of force. The processor may also use the characterization of the venting state to determine the amount of force using the selected measurements.

In some embodiments, the method 1500 may include determining the amount of force applied to the device using pressure measurements (and not capacitive force sensor measurements) when the amount of force applied to the device is determined for a time period that immediately follows a touch detected by a touch sensor of the device. In some embodiments, the method 1500 may include determining the amount of force applied to the cover using capacitive force sensor measurements (and not pressure measurements) when the amount of force applied to the device is determined for a second period of time following a touch detected by the touch sensor. In some embodiments, the method 1500 may include determining the amount of force applied to the cover using both pressure measurements and capacitive force sensor measurements when the amount of force applied to the device is determined for a third time period following the touch detected by the touch sensor. The third time period may be between the first time period and the second time period.

In some embodiments, the method 1500 may include determining the amount of force applied to the device using pressure measurements, capacitive force sensor measurements, or a combination of both, depending on the characterization of the venting state of the interior volume and/or the characterization of other system parameters.

Figure 16A:
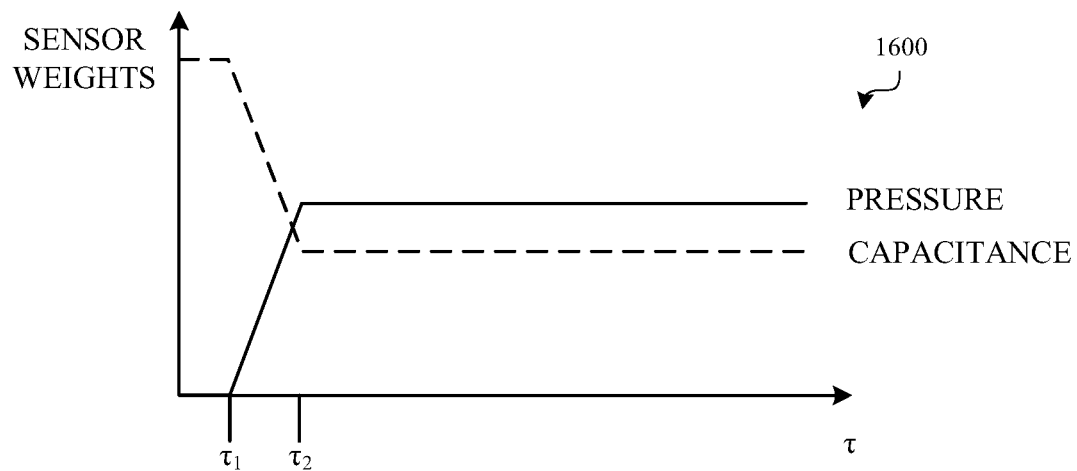
FIGS. 16A-16C provide examples of how pressure measurements and/or capacitive force sensor measurements may be used to determine an amount of force applied to a device.
Figure 16B:
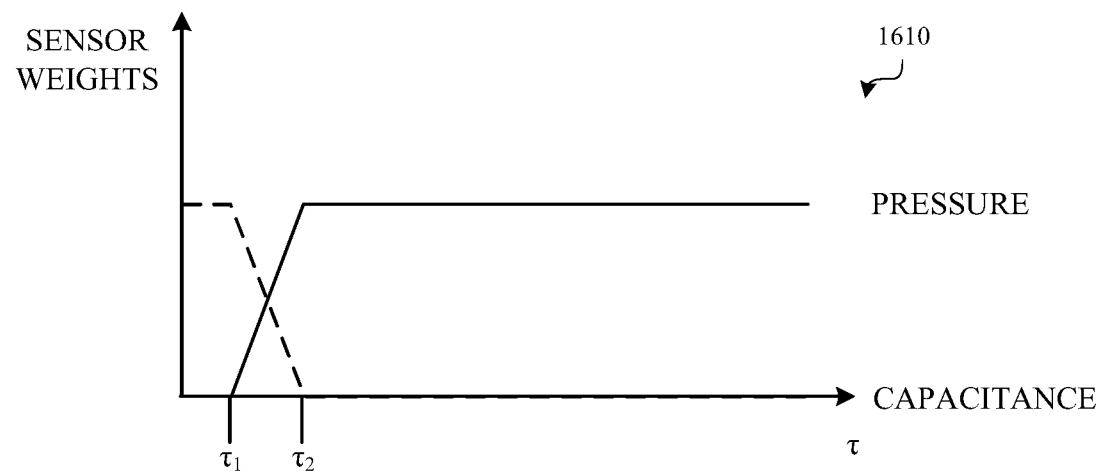
Figure 16C:
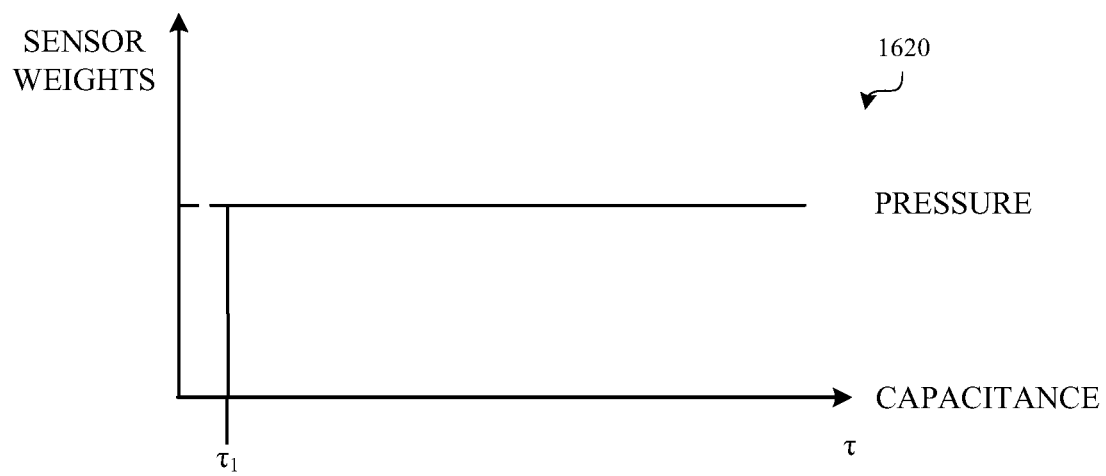

FIGS. 16A-16C provide examples of how pressure measurements and/or capacitive force sensor measurements may be used to determine an amount of force applied to a device. As shown in the graph 1600 of FIG. 16A, capacitance measurements obtained from a capacitive force sensor may be used to determine an amount of force applied to a device at values of $\tau$ below a first threshold, $\tau_1$, and pressure measurements may not be used to determine the amount of force at values of $\tau$ below the first threshold. As values of $\tau$ increase from the first threshold to a second threshold, $\tau_2$ (with the second threshold being greater than the first threshold), capacitance measurements may be given increasingly less weight in determining an amount of force applied to the device, and pressure measurements may be given increasingly more weight. For values of $\tau$ above the second threshold, pressure measurements may be given more weight than capacitance measurements, but each may be given weight. Above the second threshold, the relative weights given to pressure measurements and capacitance measurements may remain fixed. The respective weights given to capacitance measurements and pressure measurements between $\tau_1$ and $\tau_2$ may in some cases be determined through modeling or learning.

Alternatively, and as shown in the graph 1610 of FIG. 16B, capacitance measurements obtained from the capacitive force sensor may be used to determine an amount of force applied to a device at values of $\tau$ below a first threshold, $\tau_1$, and pressure measurements may not be used to determine the amount of force at values of $\tau$ below the first threshold. As values of $\tau$ increase from the first threshold to a second threshold, $\tau_2$ (with the second threshold being greater than the first threshold), capacitance measurements may be given increasingly less weight in determining an amount of force applied to the device, and pressure measurements may be given increasingly more weight. For values of $\tau$ above the second threshold, pressure measurements may be used to determine an amount of force on the cover, and capacitance measurements may not be used to determine the amount of force. The respective weights given to capacitance measurements and pressure measurements between $\tau_1$ and $\tau_2$ may in some cases be determined through modeling or learning.

Alternatively, and as shown in the graph of 1620 of FIG. 16C, capacitance measurements obtained from the capacitive force sensor may be used to determine an amount of force applied to a device at values of $\tau$ below a threshold, $\tau_1$, and pressure measurements may not be used to determine the amount of force at values of $\tau$ below the first threshold. At or above the threshold, pressure measurements may be used to determine an amount of force applied to the device, and the capacitance measurements may not be used to determine the amount of force.

Pressure and/or capacitance measurements may also be used to characterize a force applied to a device in other ways (e.g., in ways not explicitly illustrated in FIGS. 16A-16C).

Figure 17:
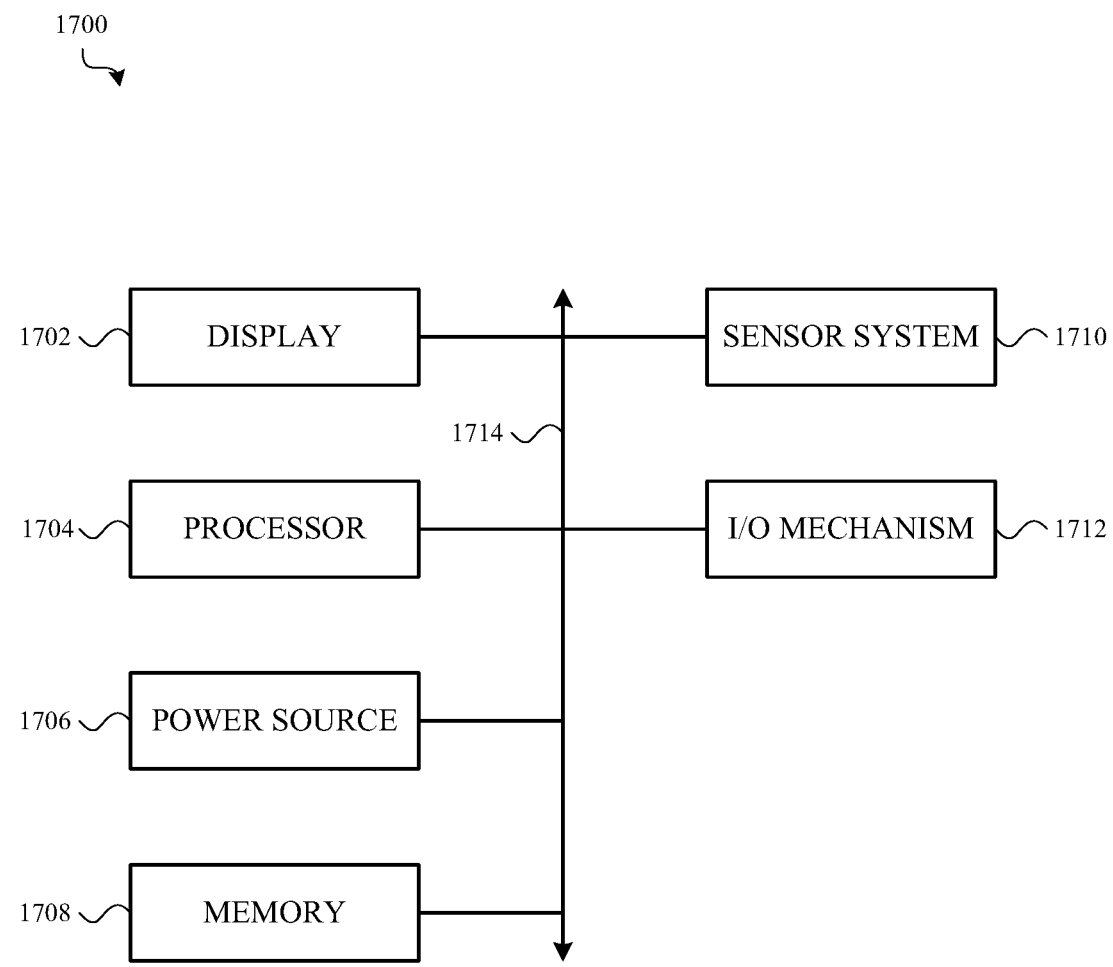
FIG. 17 shows a sample electrical block diagram of an electronic device.

FIG. 17 shows a sample electrical block diagram of an electronic device 1700, which may be the electronic device described with reference to FIGS. 1A & 1B, 2A & 2B, or 3A-3E. The electronic device 1700 may include a display 1702 (e.g., a light-emitting display), a processor 1704, a power source 1706, a memory 1708 or storage device, a sensor system 1710, and an input/output (I/O) mechanism 1712 (e.g., an input/output device and/or input/output port). The processor 1704 may control some or all of the operations of the electronic device 1700. The processor 1704 may communicate, either directly or indirectly, with substantially all of the components of the electronic device 1700. For example, a system bus or other communication mechanism 1714 may provide communication between the processor 1704, the power source 1706, the memory 1708, the sensor system 1710, and/or the input/output mechanism 1712.

The processor 1704 may be implemented as any electronic device capable of processing, receiving, or transmitting data or instructions. For example, the processor 1704 may be a microprocessor, a central processing unit (CPU), an ASIC, a digital signal processor (DSP), or combinations of such devices. As described herein, the term "processor" is meant to encompass a single processor or processing unit, multiple processors, multiple processing units, or other suitably configured computing element or elements. The processor 1704 may be an example of the processor 112 described with reference to FIG. 1B.

In some embodiments, the components of the electronic device 1700 may be controlled by multiple processors. For example, select components of the electronic device 1700 may be controlled by a first processor and other components of the electronic device 1700 may be controlled by a second processor, where the first and second processors may or may not be in communication with each other.

The power source 1706 may be implemented with any device capable of providing energy to the electronic device 1700. For example, the power source 1706 may be one or more batteries or rechargeable batteries. Additionally or alternatively, the power source 1706 may be a power connector or power cord that connects the electronic device 1700 to another power source, such as a wall outlet.

The memory 1708 may store electronic data that may be used by the electronic device 1700. For example, the memory 1708 may store electrical data or content such as, for example, audio and video files, documents and applications, device settings and user preferences, timing signals, control signals, data structures or databases, image data, or focus settings. The memory 1708 may be configured as any type of memory. By way of example only, the memory 1708 may be implemented as random access memory, read-only memory, Flash memory, removable memory, other types of storage elements, or combinations of such devices.

The electronic device 1700 may also include one or more sensors defining the sensor system 1710. The sensors may be positioned substantially anywhere on the electronic device 1700. The sensor(s) may be configured to sense substantially any type of characteristic, such as but not limited to, touch, force, pressure, light, heat, movement, relative motion, biometric data, and so on. For example, the sensor system 1710 may include a touch sensor, a force sensor, a heat sensor, a position sensor, a light or optical sensor, an accelerometer, a pressure sensor (e.g., a pressure transducer), a gyroscope, a magnetometer, a health monitoring sensor, and so on. Additionally, the one or more sensors may utilize any suitable sensing technology, including, but not limited to, capacitive, ultrasonic, resistive, optical, ultrasound, piezoelectric, and thermal sensing technology. The sensor system 1710 may include any of the sensors described herein.

The I/O mechanism 1712 may transmit and/or receive data from a user or another electronic device. An I/O device may include a display, a touch sensing input surface such as a track pad, one or more buttons (e.g., a graphical user interface "home" button), one or more cameras, one or more microphones or speakers, one or more ports such as a microphone port, and/or a keyboard. Additionally or alternatively, an I/O device or port may transmit electronic signals via a communications network, such as a wireless and/or wired network connection. Examples of wireless and wired network connections include, but are not limited to, cellular, Wi-Fi, Bluetooth, IR, and Ethernet connections.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

What is claimed is:

1. An electronic device, comprising:
   a pressure sensor disposed within an interior volume of the electronic device and configured to generate a first time-dependent sequence of measurements related to a force applied to the electronic device;
   a capacitive force sensor disposed to detect distortion of the interior volume and generate a second time-dependent sequence of measurements related to the force; and
   a processor configured to,
      characterize, using at least the first time-dependent sequence of measurements, a venting state of the interior volume, the venting state indicating how slowly or quickly air escapes from the interior volume to an ambient environment of the electronic device when the force is applied to the electronic device;
      select a set of measurements based at least in part on the venting state, the selected set of measurements including:
         at least some measurements in the first time-dependent sequence of measurements when the venting state satisfies a threshold; and
         at least some measurements in the second time-dependent sequence of measurements when the venting state does not satisfy the threshold; and
      determine an amount of the force applied to the electronic device using the selected set of measurements.

2. The electronic device of claim 1, wherein the processor is configured to characterize the venting state by:
   determining that the force applied to and lifted off of the electronic device,
      has a peak pressure that satisfies a threshold pressure; and
      has a liftoff period that satisfies a threshold liftoff period; and
   characterize the venting state using measurements in the first time-dependent sequence of measurements obtained during the liftoff period.

3. The electronic device of claim 2, wherein the processor is configured to characterize the venting state using measurements in the first time-dependent sequence of measurements by:

fitting measurements in the first time-dependent sequence of measurements, obtained during the liftoff period, to a curve associated with a discrete venting state.

4. The electronic device of claim 2, wherein the determinations regarding the force applied to and lifted off of the electronic device are made using measurements in the first time-dependent sequence of measurements.

5. The electronic device of claim 1, wherein:
the processor is further configured to:
  determine, using the first time-dependent sequence of measurements, that the force applied to the electronic device has a peak pressure that satisfies a threshold pressure;
  determine, using the second time-dependent sequence of measurements, that the force applied to the electronic device displaces a surface of the electronic device more than a threshold displacement amount; and
  characterize the venting state using a combination of measurements in the first time-dependent sequence of measurements and measurements in the second time-dependent sequence of measurements when the peak pressure exceeds the threshold pressure and the surface is displaced more than the threshold displacement amount.

6. The electronic device of claim 1, wherein:
the processor is further configured to:
  determine, using the first time-dependent sequence of measurements, that the force applied to and lifted off of the electronic device has a peak pressure below a threshold pressure;
  determine, using the second time-dependent sequence of measurements, that the force applied to and lifted off of the electronic device displaces a surface of the electronic device more than a displacement threshold amount; and
  characterize the venting state as not satisfying the threshold amount.

7. The electronic device of claim 1, wherein the processor is configured to characterize the venting state by:
  identifying a set of tap inputs on a surface of the electronic device, in which each tap input of the set of tap inputs has a maximum pressure exceeding a threshold pressure;
  determining, using the first time-dependent sequence of measurements, an energy ratio for each tap input in the set of tap inputs; and
  characterizing a change in the venting state compared to a previously determined venting state using the energy ratio.

8. The electronic device of claim 1, wherein:
the threshold is a first threshold; and
the selected set of measurements include the second time-dependent sequence of measurements when the venting state does not satisfy a second threshold, the second threshold lower than the first threshold.

9. A method of determining an amount of force applied to an electronic device, comprising:
  receiving from a pressure sensor disposed within an interior volume of the electronic device, in response to a force applied to the electronic device, a first time-dependent sequence of measurements representing a pressure change in the interior volume;
  receiving from a capacitive force sensor disposed to detect distortion of the interior volume, in response to the force applied to the electronic device, a second time-dependent sequence of measurements related to the force applied to the electronic device;
  characterizing, using at least the first time-dependent sequence of measurements, a venting state of the interior volume, the venting state indicating how slowly or quickly air escapes from the interior volume to an ambient environment of the electronic device when the force is applied to the electronic device;
  selecting a set of measurements based at least in part on the venting state, the selected set of measurements comprising:
    at least some measurements in the first time-dependent sequence of measurements when the venting state satisfies a threshold; and
    at least some measurements in the second time-dependent sequence of measurements when the venting state does not satisfy the threshold; and
  determining an amount of the force applied to the electronic device using the selected set of measurements.

10. The electronic device of claim 1, wherein:
the processor is configured to:
  estimate current measurements in the second time-dependent sequence of measurements using:
    prior measurements in the second time-dependent sequence of measurements; and
    measurements in the first time-dependent sequence of measurements;
  quantify an error between the measurements in the second time-dependent sequence of measurements and the estimated current measurements in the second time-dependent sequence of measurements; and
  estimate, using the quantified error, a parameter of the electronic device affecting at least one of the first time-dependent sequence of measurements or the second time-dependent sequence of measurements.

11. The electronic device of claim 10, wherein the processor is further configured to:
  characterize the force applied to the electronic device using the estimated parameter.

12. The electronic device of claim 1, wherein:
the processor is configured to:
  estimate current measurements in the first time-dependent sequence of measurements using:
    prior measurements in the first time-dependent sequence of measurements; and
    measurements in the second time-dependent sequence of measurements;
  quantify an error between the measurements in the first time-dependent sequence of measurements and the estimated current measurements in the first time-dependent sequence of measurements; and
  estimate, using the quantified error, a parameter of the electronic device affecting at least one of the first time-dependent sequence of measurements or the second time-dependent sequence of measurements.

13. The electronic device of claim 10, wherein the parameter of the electronic device comprises the venting state of the interior volume.

14. The electronic device of claim 10, wherein the parameter of the electronic device comprises a steady-state sensitivity of the pressure sensor or the capacitive force sensor to the force applied to the electronic device.

15. The electronic device of claim 10, wherein the parameter of the electronic device comprises a relative sensitivity between:
  a steady-state sensitivity of the pressure sensor to the force applied to the electronic device; and a steady-state sensitivity of the capacitive force sensor to the force applied to the electronic device.

16. The electronic device of claim 10, wherein:
the parameter of the electronic device comprises a uniform load sensitivity of the capacitive force sensor.

17. The electronic device of claim 10, wherein the parameter of the electronic device is a first parameter, and the processor is further configured to:
jointly estimate with the first parameter, using the quantified error, a second parameter of the electronic device.

18. The electronic device of claim 10, wherein the measurements in the first and second time-dependent sequences of measurements are limited to measurements generated during application of the force applied to the electronic device.

19. The electronic device of claim 10, wherein the processor is configured to:
determine at least one precursor condition is met, the at least one precursor condition including: peak measurements in the first time-dependent sequence of measurements that satisfy a first threshold; peak measurements in the second time-dependent sequence of measurements that satisfy a second threshold; an availability of measurements in the first time-dependent sequence of measurements or the second time-dependent sequence of measurements over a minimum time period; or an availability of measurements in the first time-dependent sequence of measurements or the second time-dependent sequence of measurements that satisfy a minimum signal-to-noise ratio; and
estimate the current measurement, quantify the error, and estimate the parameter after determining the at least one precursor condition is met.

20. The method of claim 9, wherein:
the threshold is a first threshold; and
selecting the second time-dependent sequence of measurements when the venting state does not satisfy a second threshold, the second threshold lower than the first threshold.

* * * * *